US012608851B2

(12) United States Patent
Wang et al.

(10) Patent No.: US 12,608,851 B2
(45) Date of Patent: Apr. 21, 2026

(54) METHOD, APPARATUS, DEVICE AND COMPUTER PROGRAM PRODUCT FOR GENERATING VIDEO

(71) Applicant: Beijing Youzhuju Network Technology Co., Ltd., Beijing (CN)

(72) Inventors: Jiawei Wang, Beijing (CN); Yuchen Zhang, Beijing (CN); Jiaxin Zou, Beijing (CN); Yan Zeng, Beijing (CN); Guoqiang Wei, Beijing (CN); Liping Yuan, Beijing (CN); Hang Li, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/774,689

(22) Filed: Jul. 16, 2024

(65) Prior Publication Data

US 2025/0245868 A1 Jul. 31, 2025

(30) Foreign Application Priority Data

Jan. 30, 2024 (CN) .......................... 202410131098.8

(51) Int. Cl.
*G06T 11/00* (2006.01)
*G06F 40/289* (2020.01)

(52) U.S. Cl.
CPC ............ *G06T 11/00* (2013.01); *G06F 40/289* (2020.01); *G06T 2210/12* (2013.01)

(58) Field of Classification Search
None
See application file for complete search history.

(56) References Cited

U.S. PATENT DOCUMENTS

| | | | |
|---|---|---|---|
| 6,967,666 B1 | 11/2005 | Koda | |
| 2017/0091992 A1* | 3/2017 | Rogers | G06T 17/20 |
| 2022/0114791 A1 | 4/2022 | Fleischman et al. | |
| 2024/0249457 A1* | 7/2024 | Kalish | G06T 13/00 |

(Continued)

FOREIGN PATENT DOCUMENTS

| | | |
|---|---|---|
| CN | 110874859 A | 3/2020 |
| CN | 111432289 A | 7/2020 |
| CN | 113392231 A | 9/2021 |

(Continued)

OTHER PUBLICATIONS

Provisional of 20240282343 (Year: 2023).*

(Continued)

*Primary Examiner* — Nurun Flora
(74) *Attorney, Agent, or Firm* — Alleman Hall LLP

(57) ABSTRACT

The present disclosure relates to a method and apparatus for generating a video, a device, and a computer program product. The method includes obtaining content information related to content of the video to be generated, where the content information includes at least one of a text or an image. The method further includes obtaining position information indicating a position of an object in the video in a starting frame. The method also includes obtaining control information that constrains a position of the object in an ending frame. In addition, the method further includes generating the video based on the content information, the position information, and the control information.

20 Claims, 13 Drawing Sheets

(56) References Cited

U.S. PATENT DOCUMENTS

| | | | | |
|---|---|---|---|---|
| 2024/0265692 A1* | 8/2024 | Smith | .................... | G06V 10/86 |
| 2024/0282343 A1* | 8/2024 | Kalish | ................. | G11B 27/031 |

FOREIGN PATENT DOCUMENTS

| | | | |
|---|---|---|---|
| CN | 115222859 A | 10/2022 |
| EP | 4131936 A1 | 2/2023 |
| JP | 2018503279 A | 2/2018 |
| JP | 2019154045 A | 9/2019 |
| JP | 2021033961 A | 3/2021 |
| JP | 2021193559 A | 12/2021 |
| WO | 2022166709 A1 | 8/2022 |

OTHER PUBLICATIONS

Ma, et al., "Trailblazer: Trajectory control for diffusion-based video generation." Sun, Dec. 31, 2023, arXiv:2401.00896 (Year: 2023).*
Second Office Action for Chinese Application No. 202410131098.8, mailed on Oct. 19, 2024, 14 pages.
Extended European Search Report issued in European Application No. 24189010.2, Dec. 10, 2024, Germany, 8 pages.
Openshot Video Editor: "Basic Animation | OpenShot Video Editor Tutorial," Nov. 13, 2017, XP093229138, Retrieved from the Internet: URL:[https://www.youtube.com/watch?v=P3zlprwrirk], 2 pages.
Japan Patent Office, Office Action Issued in Application No. 2024114013, Aug. 5, 2025, 8 pages.
Ministry of Intellectual Property (MOIP), Office Action Issued in Application No. 10-2024-0094645, Nov. 19, 2025, Korea, 8 pages.

* cited by examiner

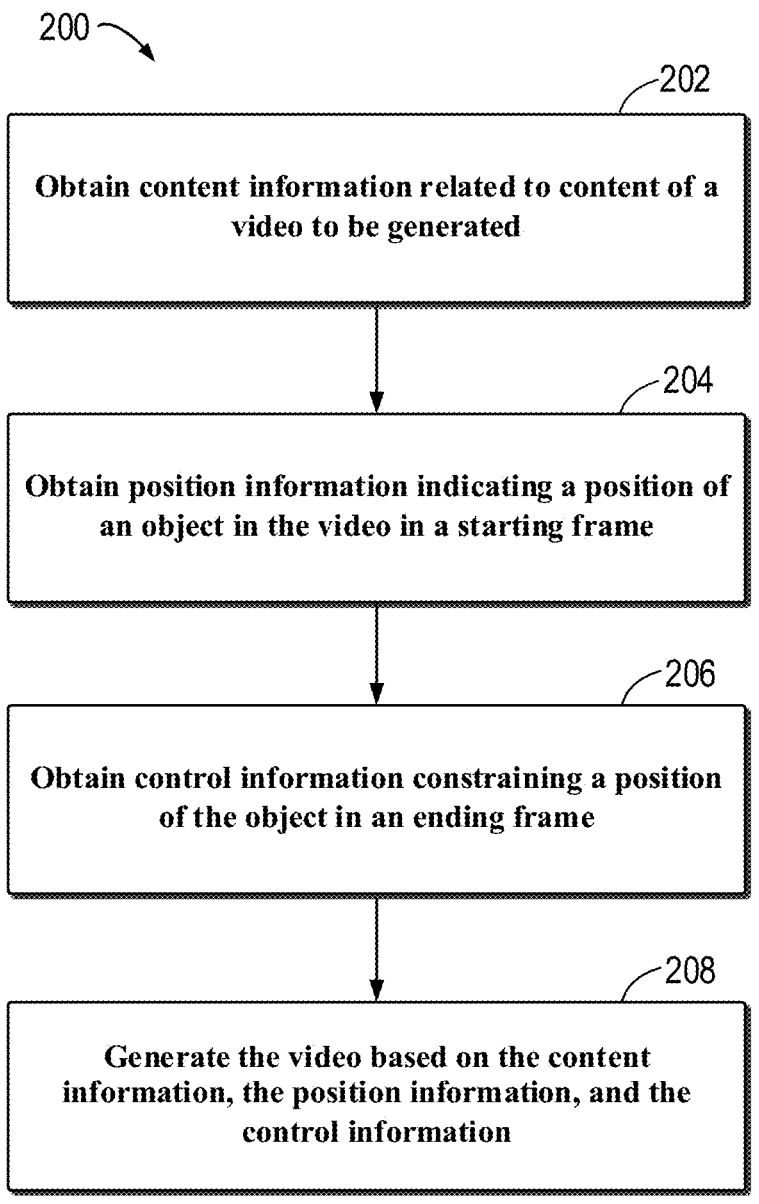

200

202

Obtain content information related to content of a video to be generated

204

Obtain position information indicating a position of an object in the video in a starting frame

206

Obtain control information constraining a position of the object in an ending frame

208

Generate the video based on the content information, the position information, and the control information

FIG. 2

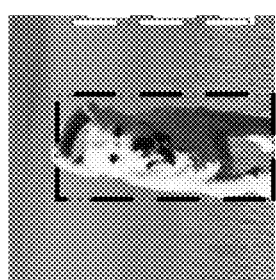
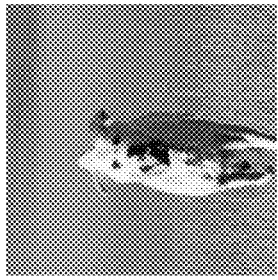
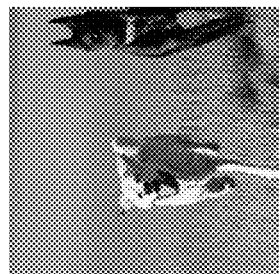
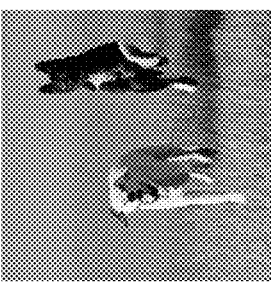
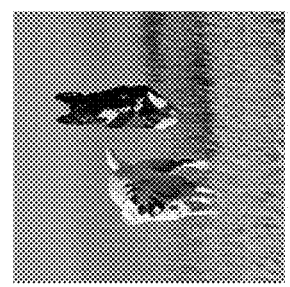
340
FIG. 3B

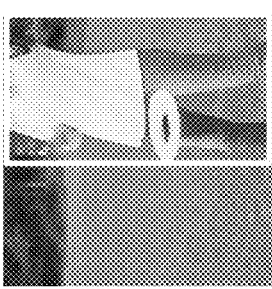
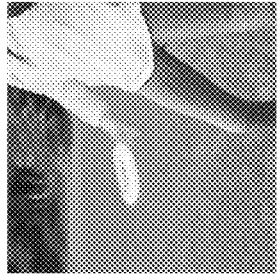
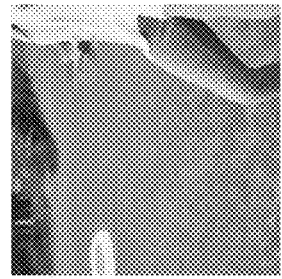
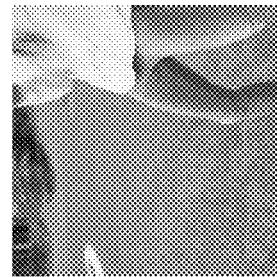
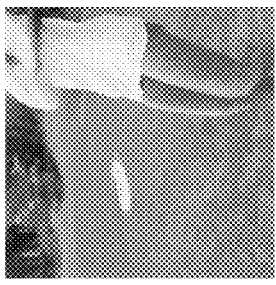
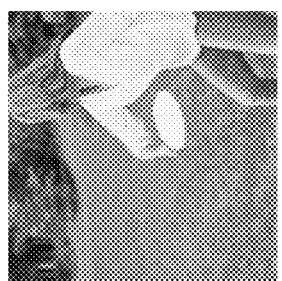
440
FIG. 4B

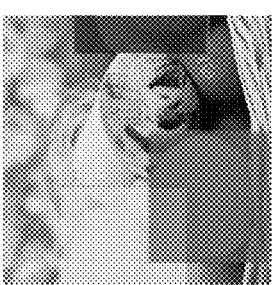
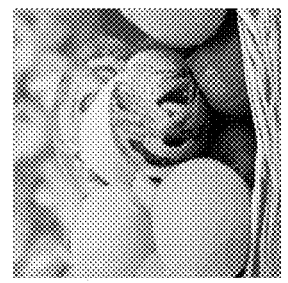
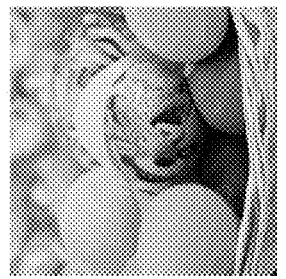
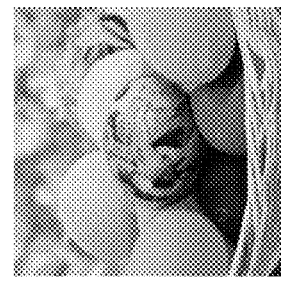
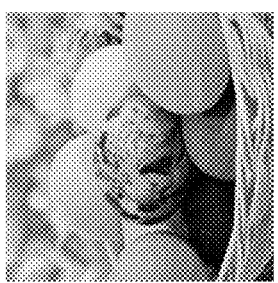
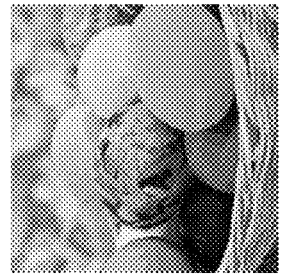
540
FIG. 5B

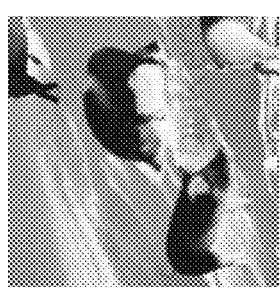
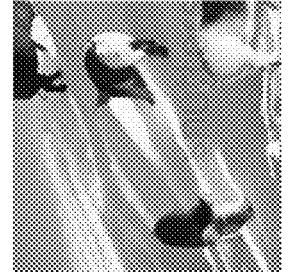
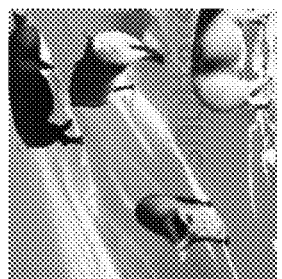
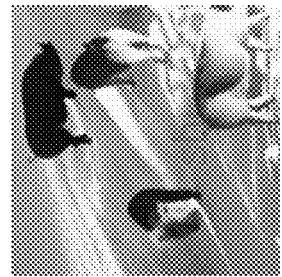
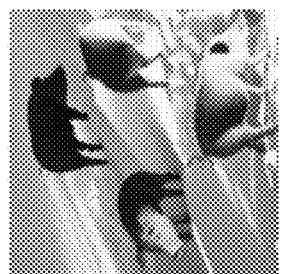
650
FIG. 6B

800

802

Content information obtaining module

804

Bounding box obtaining module

806

Control information obtaining module

808

Video generation module

METHOD, APPARATUS, DEVICE AND COMPUTER PROGRAM PRODUCT FOR GENERATING VIDEO

CROSS-REFERENCE TO RELATED APPLICATION(S)

This application claims priority to Chinese Application No. 202410131098.8 filed on Jan. 30, 2024, the disclosure of which is incorporated herein by reference in its entirety.

FIELD

The present disclosure generally relates to the field of artificial intelligence, and more specifically, relates to a method, apparatus, electronic device and computer program product for generating a video.

BACKGROUND

Text-guided video generation is a technology that utilizes a natural language text to guide the generation of video content. Through deep learning and the artificial intelligence technology, a system can understand an input text description, convert it into specific visual content, and generate a corresponding video. The method can be applied in fields such as film production, virtual reality, and animation production, providing creators with a more intuitive and efficient way to express their creativity.

Motion control refers to precise control on the motion of an object or a camera to achieve various effects and dynamic effects in the video. The technology can be implemented through programming or automated systems, making video production more creative and dynamic. Motion control is widely used in fields such as movies and virtual reality, providing viewers with more immersive and engaging visual experience.

The combination of text-guided video generation and motion control can achieve smarter and more personalized video creation. Through text guidance, the creators can describe desired scenarios and effects in natural language, while motion control can ensure that these ideas can be accurately and smoothly presented in the video, providing greater flexibility and creativity in the creative process.

SUMMARY

In a first aspect of embodiments of the present disclosure, a method for generating a video is provided. The method includes obtaining content information related to content of the video to be generated, where the content information comprises at least one of a text or an image. The method further includes obtaining position information indicating a position of an object in the video in a starting frame. The method also includes obtaining control information constraining a position of the object in an ending frame. In addition, the method further includes generating the video based on the content information, the position information, and the control information.

In a second aspect of the embodiments of the present disclosure, an apparatus for generating a video is provided. The apparatus includes a content information obtaining module, configured to obtain content information related to content of the video to be generated, where the content information comprises at least one of a text or an image. The apparatus further includes a position information obtaining module, configured to obtain position information indicating a position of an object in the video in a starting frame. The apparatus further includes a control information obtaining module, configured to obtain control information constraining a position of the object in an ending frame. In addition, the apparatus further includes a video generation module, configured to generate the video based on the content information, the position information, and the control information.

In a third aspect of the embodiments of the present disclosure, an electronic device is provided. The electronic device includes one or more processors; and a storage apparatus, configured to store one or more programs. The one or more programs, when executed by the one or more processors, cause the one or more processors to implement the method for generating a video. The method includes obtaining content information related to content of the video to be generated, where the content information comprises at least one of a text or an image. The method further includes obtaining position information indicating a position of an object in the video in a starting frame. The method also includes obtaining control information constraining a position of the object in an ending frame. In addition, the method further includes generating the video based on the content information, the position information, and the control information.

In a fourth aspect of the embodiments of the present disclosure, a computer program product is provided. The computer program product is tangibly stored on a non-transitory computer-readable medium and includes machine-executable instructions, and the machine-executable instructions, when executed, cause a machine to implement the method for generating a video. The method includes obtaining content information related to content of the video to be generated, where the content information comprises at least one of a text or an image. The method further includes obtaining position information indicating a position of an object in the video in a starting frame. The method also includes obtaining control information constraining a position of the object in an ending frame. In addition, the method further includes generating the video based on the content information, the position information, and the control information.

The section Summary is provided to introduce concept selection in a simplified form, which will be further described in the following specific implementations. The section Summary is not intended to identify key or essential features of the subject claimed for protection, nor is it intended to limit the scope of the subject claimed for protection.

BRIEF DESCRIPTION OF THE DRAWINGS

The above and other features, advantages, and aspects of various embodiments of the present disclosure will become more apparent in conjunction with the accompanying drawings and with reference to following detailed descriptions. In the accompanying drawings, the same or similar reference numerals denote the same or similar elements.

FIG. 2 illustrates a flowchart of a method for generating a video according to some embodiments of the present disclosure;

FIGS. 3A-3B illustrate schematic diagrams of an example that a user respectively inputs a plurality of bounding boxes in a starting frame and an ending frame according to some embodiments of the present disclosure;

FIGS. 4A-4B illustrate schematic diagrams of an example that a user inputs a bounding box and a motion trajectory of an object in a starting frame according to some embodiments of the present disclosure;

FIGS. 5A-5B illustrate schematic diagrams of an example that a user inputs a plurality of soft bounding boxes in an ending frame without inputting a text description according to some embodiments of the present disclosure;

FIGS. 6A-6B illustrate schematic diagrams of an example that a user inputs a plurality of bounding boxes in a starting frame without providing images according to some embodiments of the present disclosure;

DETAILED DESCRIPTION OF EMBODIMENTS

Figure 1:
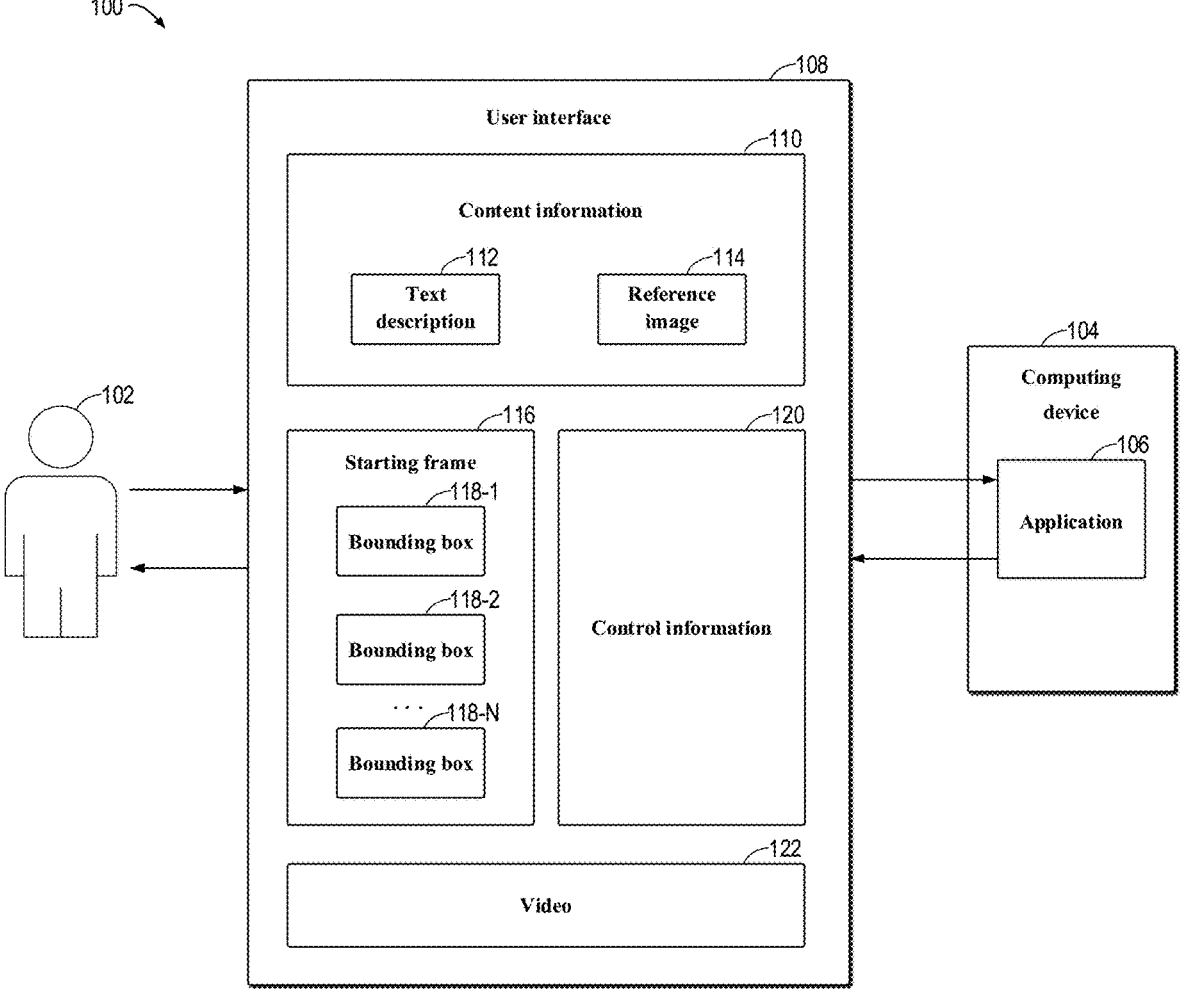
FIG. 1 illustrates a schematic diagram of an example environment where a plurality of embodiments of the present disclosure may be implemented.

It should be understood that all user-related data involved in the technical solution should be obtained and used after user authorization, which means that in the technical solution, if personal information of a user needs to be used, explicit consent and authorization from the user are required before obtain these data, otherwise, relevant data collection and use will not be carried out. It should also be understood that when the technical solution is implemented, relevant laws and regulations should be strictly followed in the process of data collection, use, and storage, and necessary technologies and measures should be taken to ensure the security of user data and the safe use of data.

The embodiments of the present disclosure will be described in more detail below with reference to the accompanying drawings. Although the accompanying drawings show some embodiments of the present disclosure, it should be understood that the present disclosure may be implemented in various forms, and should not be construed as being limited to the embodiments stated herein. On the contrary, these embodiments are provided for a more thorough and complete understanding of the present disclosure. It should be understood that the accompanying drawings and the embodiments of the present disclosure are for exemplary purposes only, and are not intended to limit the scope of protection of the present disclosure.

In the description of the embodiments of the present disclosure, the term "include" and similar terms thereof should be understood as open-ended inclusions, that is, "including but not limited to". The term "based on" should be understood as "at least partially based on." The term "an embodiment" or "this embodiment" should be understood as "at least one embodiment". The terms "first", "second", etc. may refer to different or identical objects, unless otherwise explicitly specified. Other explicit and implicit definitions may also be included below.

In some scenarios of video generation guided by texts or reference images, a user hopes to provide information about a motion mode of an object in a generated video by inputting a text description. For example, the user may provide a captured reference image with a building and then input a text description like "Tilt a camera upward and reveal the top of the building". In this case, the user expects that in the generated video, the camera gradually tilts upward from the perspective of shooting the ground and finally captures the top of the building. However, in the related art, although it is possible to generate a video with a high-quality screen and a slowly moving camera shot based on the reference image and the text description provided by the user, a model cannot well understand the requirement of the user for the motion mode of the object in the video, and as a result, the top of the building cannot be accurately revealed in the generated video.

Additionally, in some usage scenarios, when the user has a precise requirement for the motion mode, it is difficult to accurately describe a desired screen through language. For example, when the user expects a video in which two puppies are running towards the camera, with one white puppy getting closer to the camera and running to the center of a screen, filling one-third of the screen at that point. Simultaneously, the other black puppy is also approaching the camera, but running toward a toy beside the camera, and as a result, is increasingly deviating from the center of the screen and finally disappearing from the right side of the screen. It is very difficult for an ordinary user to accurately describe such motion requirements, making it impossible to generate the desired video.

In view of this, embodiments of the present disclosure provide a solution for generating a video. In the solution, the user may input content information related to content of a video to be generated in a user interface provided by an application. The content information may be a text description, or a key frame of the video, or both of them. Then, the user may identify, using a bounding box, an object subjected to motion control in a starting frame, and input, in the user interface, control information about how the object is expected to move. The control information at least includes a position of the object in an ending frame. Then, the application may generate the video based on the content information, the bounding box for identifying the object, and the content information.

In this way, the user can use the bounding box in the starting frame to accurately identify the object to be controlled. Additionally, the user can accurately express the position of the identified object moving from the starting frame to the ending frame, allowing the application to receive precise motion control requirements and generate the video that meets user expectations.

FIG. 1 illustrates a schematic diagram of an example environment 100 where a plurality of embodiments of the present disclosure may be implemented. As shown in FIG. 1, the environment 100 includes a user 102 and a computing device 104. The computing device 104 may be a device such as a user terminal, a mobile device, and a computer, or may also be a device such as a computing system, a single server, a distributed server, or a cloud-based server. The computing device 104 includes an application 106, and the application 106 may provide a video generation function. The application 106 may be any application such as a local application, a remote application, a browser/server architecture application, and a client/server architecture application.

As shown in FIG. 1, in the environment 100, the user 102 may interact with the application 106 via a user interface 108. The user 102 may input content information 110 related to content of a video to be generated on the user interface 108. The content information 110 may be a text description 112, or a reference image 114, or both of them. For example, the text description 112 may be "Two puppies are running towards the camera", and the reference image 114 may be an image of two puppies running on the grass. It should be noted that in some implementations, the text description 112 may be indirectly provided via a user interaction method such as voice, and therefore the text description 112 also includes a text indirectly provided through a method such as voice. The user 102 may identify objects with motions to be controlled by drawing bounding boxes 118-1, 118-2, . . . , and 118-N (collectively referred to as a bounding box 118) in an area where a starting frame 116 is displayed. It should be understood that although a plurality of bounding boxes 118 are shown in FIG. 1, the user may also draw only one bounding box 118 to control the motion of a single object. If the content information 110 includes the reference image 114, the reference image 114 may be displayed in the area of the starting frame 116 to facilitate the user to use the bounding box 118 to identify the object with the motion to be controlled.

As shown in FIG. 1, in the environment 100, the user 102 may input control information 120 via the user interface 108 to at least describe the position of the controlled object in the ending frame of the video. In some embodiments, the control information 120 may be a bounding box drawn by the user 102 in the area of the ending frame to represent a position where the controlled object is expected to move. In some embodiments, the control information 120 may be a motion trajectory of the controlled object drawn by the user 102 in the area of the starting frame 116.

In the environment 100, after the user 102 inputs the content information 110, the bounding box 118 in the starting frame 116, and the control information 120, the application 106 may generate a video 122 based on these user inputs and provide the video 122 to the user 102 via the user interface 108. For example, the computing device 104 may send these user inputs to a server and receive an address of the video 122 from the server, or the video 122 may be locally generated by the computing device 104. In the user interface 108, the video 122 may be, for example, displayed to the user 102 via a video playback control, or may be provided to the user 102 in the form of a download control. Content of the video 122 is related to the content information 110, and the controlled object identified by the bounding box 118 in the video 122 moves from the position in the starting frame 116 to a specified position in the ending frame according to the constraints of the control information 120.

It should be understood that although the content information 110, the starting frame 116, and the control information 120 are included in one user interface 108 in the environment 100, in some embodiments, the user 102 may input these information in different user interfaces separately. Additionally, the video 122 may also be provided to the user 102 in a separate user interface.

In this way, the user 102 may use the bounding box 118 in the starting frame 116 to accurately identify the object to be controlled. In addition, the user 102 may accurately express the position where the identified object moves from the starting frame 116 to the ending frame, such that the application 106 may receive the precise motion control requirements and generate the video that meets user expectations.

FIG. 2 illustrates a flowchart of a method 200 for generating a video according to some embodiments of the present disclosure. As shown in FIG. 2, at a block 202, the method 200 may include obtaining content information related to content of the video to be generated, where the content information includes at least one of a text or an image. For example, in the environment 100 shown in FIG. 1, the computing device 104 may obtain the content information 110 that is input by the user 102 and is related to the content of the video to be generated, and the content information 110 includes at least one of the text description 112 and the reference image 114.

At a block 204, the method 200 may include obtaining position information indicating a position of an object in the video in a starting frame. The position information may be information associated with the position, such as a bounding box, a contour, a coordinate value, and a coordinate range. For example, in the environment 100 shown in FIG. 1, the computing device 104 may obtain a bounding box 118 inputted by the user 102 in the starting frame 116. The bounding box 118 is used to identify the object subjected to motion control in the starting frame 116. When the user 102 provides the reference image 114, the content of the starting frame 116 may be the reference image 114, allowing the user to directly identify the object subjected to motion control on the reference image 114. When the user 102 does not provide the reference image 114, the content of the starting frame 116 may be blank, and the user may identify, through the bounding box 118 in a blank area, a position and a size of the object subjected to motion control.

At a block 206, the method 200 may include obtaining control information that constrains a position of the object in an ending frame. For example, in the environment 100 shown in FIG. 1, the computing device 104 may obtain the control information 120 inputted by the user 102. The control information 120 may constrain the position of the controlled object identified by the bounding box 118 in the ending frame. In some embodiments, the user 102 may provide the control information 120 by drawing the bounding box in the ending frame. In some embodiments, the user may provide the control information 120 by drawing the motion trajectory in the starting frame 116.

At a block 208, the method 200 may include generating the video based on the content information, the position information, and the control information. For example, in the environment 100 shown in FIG. 1, the computing device 104 may generate the video 122 based on the content information 110, the bounding box 118, and the control information 120. Content of the video 122 is related to content information 110, and the controlled object identified by the bounding box 118 in the video 122 moves from the position in the starting frame 116 to a specified position according to the constraints of the control information 120.

In this way, the user may use the position information in the starting frame to accurately identify the object to be controlled. Additionally, the user can accurately express the position of the identified object moving from the starting frame to the ending frame, allowing the application to receive precise motion control requirements and generate the video that meets user expectations.

In some embodiments, the above object is a first object, the above position information is a first bounding box with a first color, the above control information is first control information with the first color, and generating the video may include obtaining a second bounding box indicating a position of a second object in the video in the starting frame, where the second bounding box has a second color different from the first color. In addition, second control information that constrains a position of the second object in the ending frame may also be obtained, and the second control information has the second color. Then, the video may be generated based on the content information, the first bounding box, the first control information, the second bounding box, and the second control information.

In some embodiments, the above position information is a starting bounding box, and the above control information refers to an ending bounding box for the object in the ending frame, where both the starting bounding box and the ending bounding box are rectangular boxes. In some embodiments, in response to the user selecting a first type as the type of the ending bounding box, the video may be generated by making the object move from a position indicated by the starting bounding box to a specific position indicated by the ending bounding box, where the size of the object in the ending frame corresponds to the ending bounding box. In some embodiments, image content identified by the bounding box in the starting frame may be determined as the object, and the video may be generated based on an image of the starting frame, the object, and the control information, where the content of the video is associated with the image.

In some embodiments, in response to the ending bounding box being close to a left boundary or a right boundary of the ending frame and a width of the ending bounding box being less than a threshold width, the video may be generated by making the object move from a position in the starting frame to a position beyond the left boundary or the right boundary of the ending frame, where the size of the object as the object moves beyond the left boundary or the right boundary is associated with a height of the ending bounding box. In some embodiments, in response to the ending bounding box being close to an upper boundary or a lower boundary of the ending frame and the height of the ending bounding box being less than a threshold height, the video may be generated by making the object move from a position in the starting frame to a position beyond the upper boundary or the lower boundary of the ending frame, where the size of the object as the object moves beyond the upper boundary or the lower boundary is associated with the width of the ending bounding box, and the content of the video is associated with the content information.

In some embodiments, in response to the starting bounding box being close to a left boundary or a right boundary of the starting frame and a width of the starting bounding box being less than a threshold width, the video may be generated by making the object move from a position beyond the left boundary or the right boundary to a position constrained by the control information, where the size of the object as the object enters the left boundary or the right boundary is associated with a height of the starting bounding box. In some embodiments, in response to the starting bounding box being close to an upper boundary or a lower boundary of the starting frame and the height of the starting bounding box being less than a threshold height, the video may be generated by making the object move from a position beyond the upper boundary or the lower boundary of the starting frame to a position constrained by the control information, where the size of the object as the object enters the upper boundary or the lower boundary is associated with the width of the starting bounding box, and the content of the video is associated with the content information.

In some embodiments, the object gradually moves from a first position to a second position in the generated video. In some embodiments, in the generated video, the object moves relative to the camera by changing the perspective of the camera.

Figure 3A:
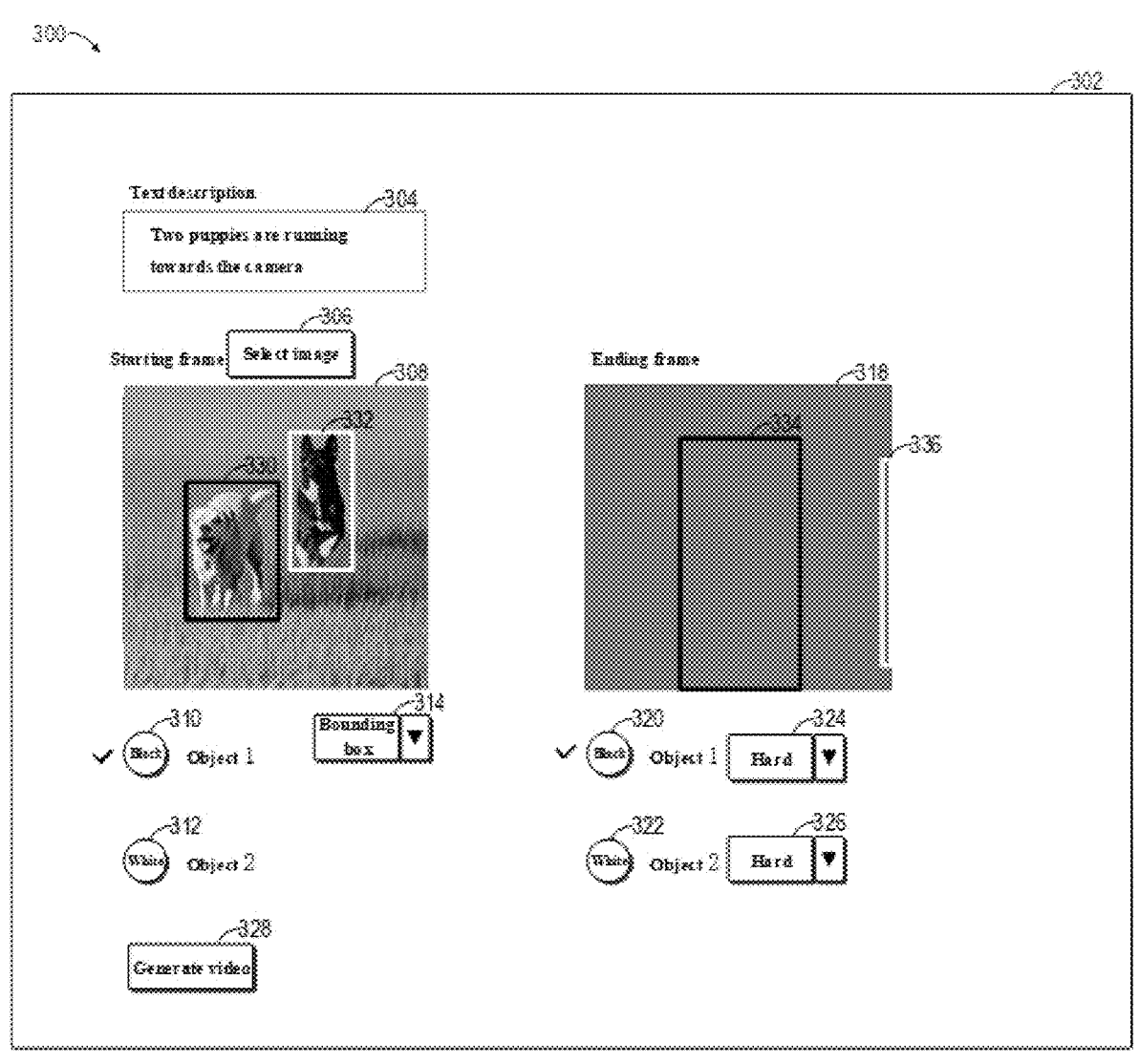

FIGS. 3A-3B illustrate schematic diagrams of an example 300 that a user respectively inputs a plurality of bounding boxes in a starting frame and an ending frame according to some embodiments of the present disclosure. As shown in FIG. 3A, the example 300 includes a user interface 302. The user interface 302 provides a control 304 for inputting a text description. The user may input the text description in the text input control 304 to describe content of a video to be generated. For example, in the example 300, the user inputs the text description "Two puppies are running towards the camera", and therefore the content of the generated video should include two puppies running towards the camera. The user interface 302 also provides an image selection control 306 for inputting a reference image. The user may interact with the control 306 to select the reference image. When the user selects the reference image, the reference image may guide the content of the generated video. For example, in the example 300, the user selects an image of two puppies (including a white puppy and a black puppy) running on the grass, and therefore the generated video should include the two puppies running on the grass as the background.

As shown in FIG. 3A, the user interface 302 also provides a starting frame control 308. When the user selects the reference image, the content of the starting frame control 308 may be display of the reference image. When the user does not select the reference image, the content of the starting frame control 308 may be blank (similar to a control 318 used to represent the ending frame in FIG. 3). The user interface 302 also provides a color display control 310 corresponding to an object 1 and a color display control 312 corresponding to an object 2 in association with the starting frame control 308. Both the objects correspond to different colors. When the user interacts with the color display control 310 or 312, the user may select which object to identify on the starting frame control 308. For example, in the example 300, the object 1 is selected, indicating that the next operation in the starting frame control 308 is an operation for the object 1. The user interface 302 also provides an operation type selection control 314. Operation types include a bounding box and a motion trajectory. When a value of the operation type selection control 314 is the bounding box, a starting bounding box identifying the object 1 may be later inputted in a dragging manner in the starting frame control 308. When a value of the operation type selection control 314 is the motion trajectory, the motion trajectory for the object 1 may be later inputted in a manner of a brush in the starting frame control 308.

As shown in FIG. 3A, the user interface 302 also provides an ending frame control 318. The content of the ending frame control 318 may be blank. The user may draw the ending bounding box in the ending frame control 318, and the ending bounding box constrains a position to which the object moves, and a size of the object. The user interface 302 also provides a color display control 320 corresponding to the object 1 and a color display control 312 corresponding to the object 2 in association with the ending frame control 318, where a value of the color display control 320 is the same as a value of the color display control 310, and a value of the color display control 322 is the same as a value of the color display control 312. In other words, the same object is represented by the same color in the starting frame control 308 and the ending frame control 318. It should be understood that although specific colors such as black and white are assigned to various objects in this embodiment of the present disclosure, it is not intended to limit the color corresponding to each object, and the color may also be yellow, purple, green, or another color.

As shown in FIG. 3A, the user interface 302 also provides a bounding box type selection control 324. There are two types of bounding boxes: a hard bounding box and a soft bounding box. The hard bounding box is used to specify a specific position and a specific size of an object, indicating that in a generated image frame, the object is generated at coordinates specified by the hard bounding box (e.g., center coordinates of the bounding box), and the size of the object corresponds to a size of the hard bounding box. The soft bounding box is used to specify a position range and a size range of an object, indicating that in a generated image frame, the object is generated within a range defined by the soft bounding box, and the size of the object does not exceed the range. When the user selects the object 1 to operate on in the ending frame and the value of the bounding box type control is the hard bounding box, a hard bounding box constraining the specific position of the object 1 after motion may be later drawn, for example, in a dragging manner, in the ending frame control 318. When the user selects the object 1 to operate on in the ending frame and the value of the bounding box type control is the soft bounding box, a soft bounding box constraining the position range of the object 1 after motion may be later drawn in the ending frame control 318.

As shown in FIG. 3A, in the example 300, the user identifies the white puppy as the object 1 with a black bounding box 330 in the starting frame control 308 and identifies a specific position to which the object 1 should move, as well as a specific size of the object 1 with a black hard bounding box 334 in the ending frame control 318. In addition, the user identifies the black puppy as the object 2 with a white bounding box 332 in the starting frame control 308, and identifies a position range and a size range within which the object 2 should move with a white hard bounding box 336 in the ending frame control 318.

As shown in FIG. 3A, in the ending frame control 318 in the example 300, the hard bounding box 336 of the object 2 is close to the right boundary of the ending frame, and has a narrow width (e.g., less than the threshold width), indicating that the black puppy corresponding to the object 2 will run out of the right boundary of the video, and when the black puppy runs out of the right boundary, the size of the black puppy is associated with a height of the hard bounding box 336. In other words, the height of the hard bounding box 336 represents a projection of a height of the object 2 onto the right boundary when the object 2 moves out of the right boundary.

Then, the user may tap a video generation control 328 to generate a video, and the generated video is shown in FIG. 3B. In the video 340 shown in FIG. 3B, the white puppy (object 1) runs from the position in the starting frame to the position specified by the hard bounding box 334 in the ending frame, and the size of the white puppy in the ending frame corresponds to the hard bounding box 334. Meanwhile, the black puppy (object 2) runs from the position in the starting frame out of the screen, and the height of the black puppy is associated with the hard bounding box 324 when the black puppy starts to run out of the screen in a third frame.

In this way, the user may use different colors to identify a plurality of controlled objects, thereby making the content of the generated video more dynamic and rich. In addition, by identifying the bounding box in the ending frame, the position to which the object moves, as well as the size of the object may be precisely controlled, such that the user may accurately express and control the motion of the object, thereby improving a motion effect of the generated video and enhancing user experience. Additionally, an effect of allowing the object to move out of the screen may also be achieved, and meanwhile, the position and the size when moving out of the screen may be specified, thereby providing rich motion control instructions to meet requirements of the user in different scenarios.

In some embodiments, the above position information is a bounding box, and the control information is a motion trajectory drawn in the starting frame. In some embodiments, the video may be generated by making the object start to move from a position indicated by the bounding box along the motion trajectory, where the content of the video is associated with the content information.

Figure 4A:
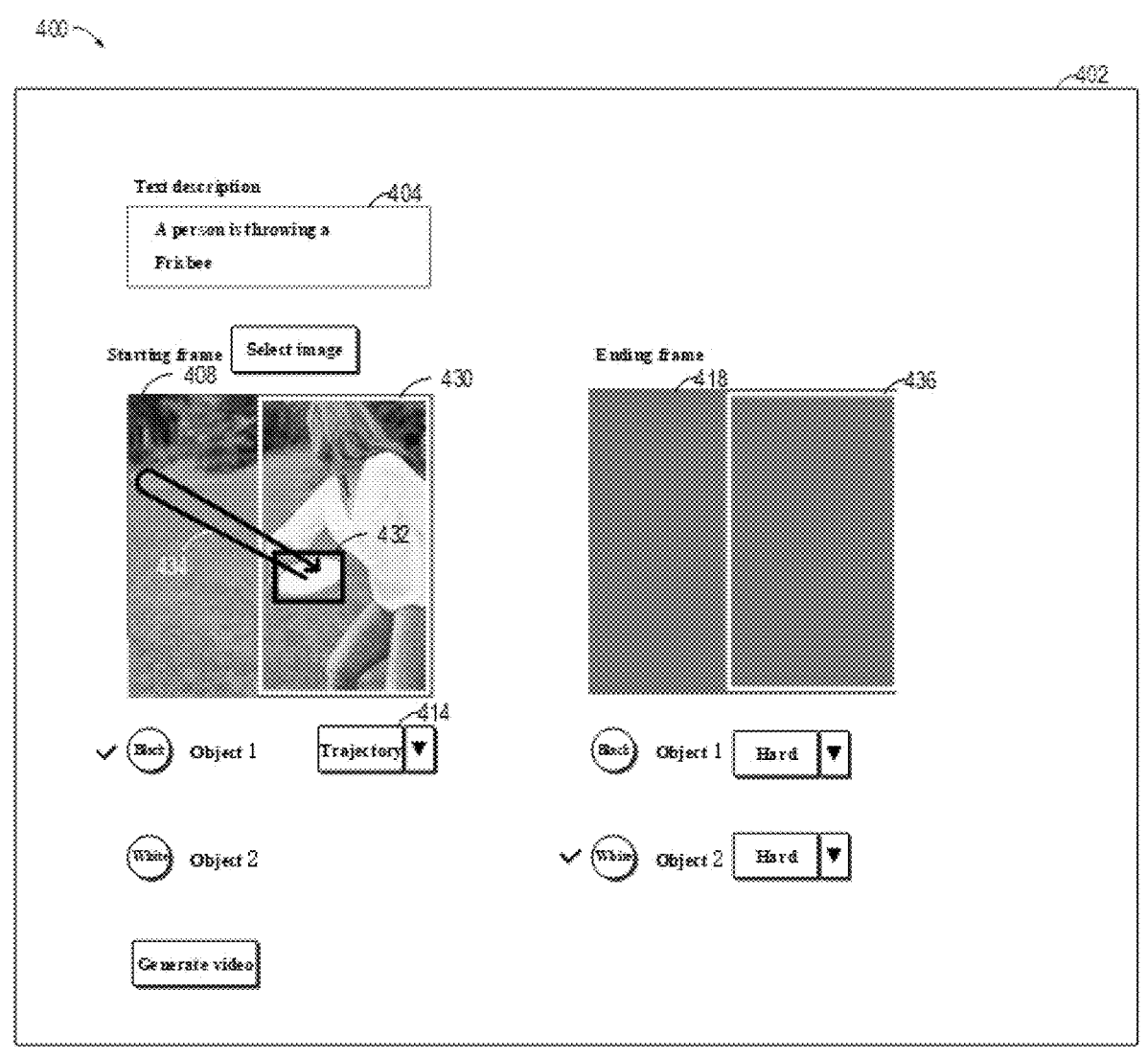

FIGS. 4A-4B illustrate schematic diagrams of an example 400 that a user inputs a bounding box and a motion trajectory of an object in a starting frame according to some embodiments of the present disclosure. As shown in FIG. 4A, in the example 400, the user inputs a text description "A person is throwing a frisbee" into a text input control 404 of a user interface 402. As shown in a starting frame control 408, the user selects a reference image, and the reference image includes a person holding a frisbee. In the example 400, the user identifies an object 1 (i.e., the frisbee) with a black bounding box 432 in the starting frame control 408. Then, the user selects a value in an operation type selection control 414 as a motion trajectory, and draws a motion trajectory 434 of the frisbee in the starting frame control 408. As shown in FIG. 4A, the motion trajectory 434 of the frisbee is similar to a "U" shape, and a starting position is close to an ending position, indicating that the frisbee will fly out from the starting position and finally fly back to the position specified by an arrow on the trajectory. In addition, the user identifies the person as an object 2 with a white bounding box 430 in the starting frame control 408 and identifies a hard bounding box 436 of the object 2 in the ending frame control 418, indicating that the object 2 will move from the position in the starting frame to the position specified by the hard bounding box 436, and the size after the motion corresponds to the size of the hard bounding box 436.

FIG. 4B shows a generated video 440. As shown in the figure, the frisbee (object 1) flies along the motion trajectory 434 from the starting position and finally flies back to the endpoint position of the motion trajectory 434. Meanwhile, the person (object 2) is located at the position specified by the hard bounding box 436 after a series of motions, with the size corresponding to the hard bounding box 436.

In this way, the user may control the motion of the object by drawing the motion trajectory of the object, and because the motion trajectory includes richer information in the motion process, the motion of the object can be more precisely controlled. In addition, it is difficult for the user to express a slightly complex motion trajectory through a text description, and therefore the method for drawing the motion trajectory may allow the user to easily express show the object moves, thereby improving the user experience.

In some embodiments, in response to the user selecting a second type as the type of the ending bounding box, the video is generated by making the object move from a position indicated by the starting bounding box to a position range indicated by the ending bounding box, where the size of the object in the ending frame does not exceed the ending bounding box, and the content of the video is associated with the content information.

Figure 5A:
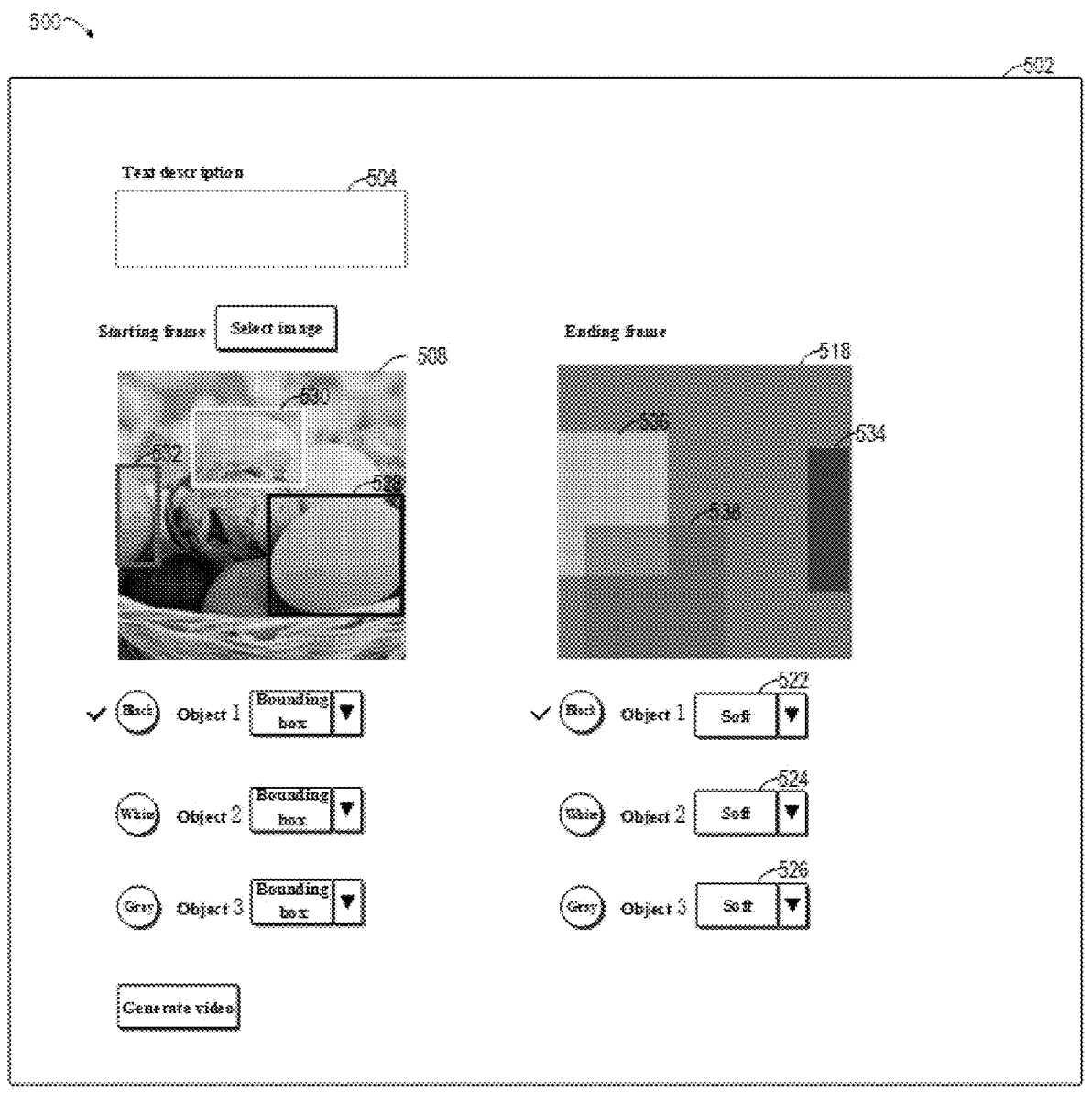

FIGS. 5A-5B illustrate schematic diagrams of an example 500 that a user inputs a plurality of soft bounding boxes in an ending frame without inputting a text description according to some embodiments of the present disclosure. As shown in FIG. 5A, in the example 500, the user does not input any content into a text input control 504 in the user interface 502, but selects a reference image. As shown in a starting frame control 508, there are a plurality of eggs placed in a basket in the reference image. In the example 500, the user identifies an object 1 (i.e., the egg located on the right of the basket) with a black bounding box 528 in the starting frame control 508, identifies an object 2 (i.e., the egg located behind the basket) with a white bounding box 530, and identifies an object 3 (i.e., the egg located on the left of the basket) with a gray bounding box 532. In the ending frame, the user selects values of bounding box type selection controls 522, 524, and 526 of the object 1, the object 2, and the object 3 as soft bounding boxes, uses a black soft bounding box 534 in an ending frame control 518 to specify a position range and a size range within which the egg on the right of the basket moves, that is, the position of the egg on the right of the basket in the ending frame does not exceed the range specified by the soft bounding box 534, and the size does not exceed the soft bounding box 534. In addition, in the ending frame control 518, the user also uses a white soft bounding box 536 to specify a position range and a size range within which the egg on the left of the basket moves, and uses a gray soft bounding box 538 to specify a position range and a size range within which the egg behind the basket moves.

FIG. 5B illustrates a generated video 540. As shown in the figure, the egg (object 1) on the right of the basket moves into an area defined by the soft bounding box 534 from a starting position, and the size does not exceed the range defined by the soft bounding box 534. The egg (object 2) behind the basket moves into an area defined by the soft bounding box 536 from the starting position, and the size does not exceed the range defined by the soft bounding box 536. The egg (object 3) on the left of the basket moves into an area defined by the soft bounding box 538 from the starting position, and the size does not exceed the range defined by the soft bounding box 538.

In this way, the user may use the soft bounding boxes to enlarge constraints on the motion of the controlled objects, such that diversity is improved while making the generated video meet constraint conditions. In addition, the demands on the user may also be reduced, that is, only a certain range needs to be constrained, thereby making operations more simple and convenient, and enhancing the user experience.

In some embodiments, a noun phrase in a text may be recognized and determined as an object. Then, a video may be generated based on the text, the objects, and control information, where the content of the video is associated with the text.

Figure 6A:
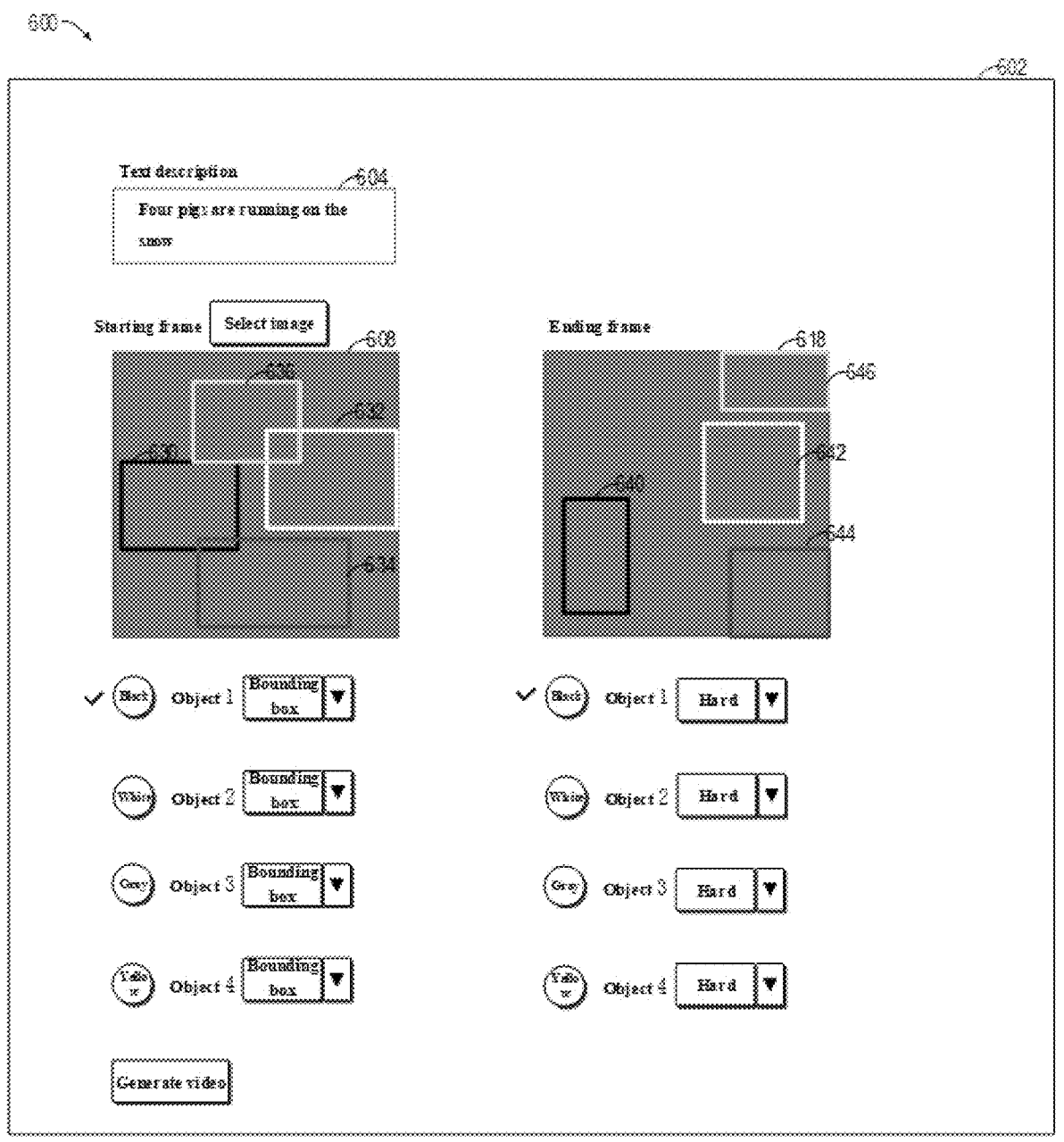

FIGS. 6A-6B illustrate schematic diagrams of an example 600 that a user inputs a plurality of bounding boxes in a starting frame without providing images according to some embodiments of the present disclosure. As shown in FIG. 6, in the example 600, the user inputs a text description "Four pigs are running on the snow" for describing content of a video in a text input control 604 of a user interface 602. However, the user does not select a reference image, such the background of a starting frame control 608 is blank. In the example 600, the user respectively uses a black bounding box 630, a white bounding box 632, a gray bounding box 634, and a yellow bounding box 636 in the starting frame control 608 to identify starting positions and sizes of the four pigs. In an ending frame control 618, the user respectively uses a black hard bounding box 640, a white hard bounding box 642, a gray hard bounding box 640, and a yellow hard bounding box 646 to identify positions and sizes of the four pigs in an ending frame.

During video generation, a video generation model may recognize noun phrases in these descriptions. Since most of these phrases are abstract nouns rather than specific object names, these noun phrases may be filtered to retain only phrases representing the specific object names. Subsequently, these filtered noun phrases may be processed to recognize controlled objects, and these objects are associated with bounding boxes.

FIG. 6B illustrates a generated video 650. As shown in the figure, the video generation model generates, based on the text description, four pigs with specified sizes at positions specified by bounding boxes 630, 632, 634, and 636, and the four generated pigs are associated with the four bounding boxes. The four pigs separately run from the starting positions to positions specified by hard bounding boxes 640, 642, 644, and 646, and the sizes of the four pigs correspond to these hard bounding boxes.

In this way, the objects in the text description may be identified without providing the reference image, such that the user may also generate the expected video even when the reference image is not available, thereby reducing preconditions for the user to generate the video using the application, and allowing more users to use the application to generate videos.

In some embodiments, third control information that constrains positions of the objects in an intermediate frame may be obtained, and the video may be generated based on the content information, the bounding boxes, the first control information, and the third control information.

Figure 7:
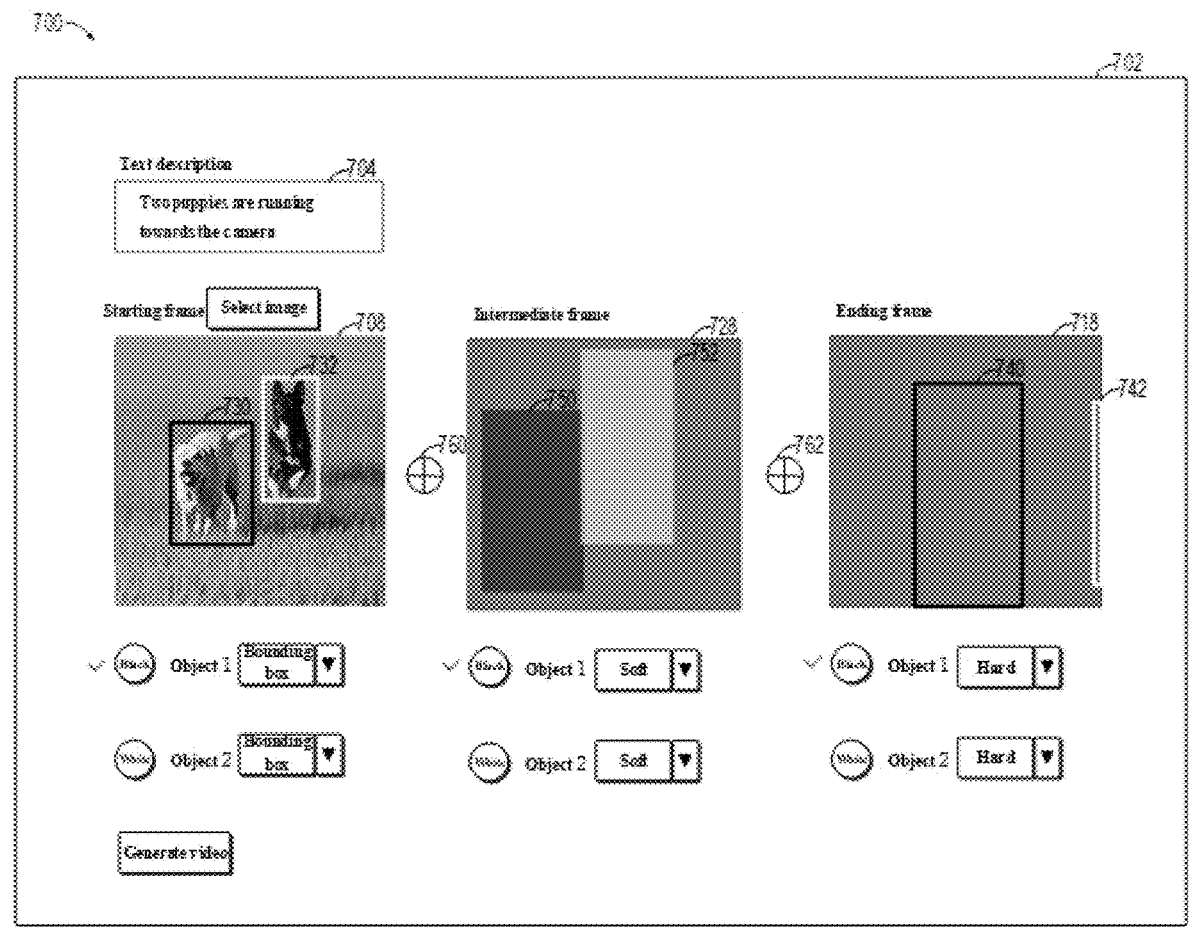
FIG. 7 illustrates a schematic diagram of an example that a user creates an intermediate frame and inputs a plurality of soft bounding boxes in the intermediate frame according to some embodiments of the present disclosure.

FIG. 7 illustrates a schematic diagram of an example 700 that a user creates an intermediate frame and inputs a plurality of soft bounding boxes in the intermediate frame according to some embodiments of the present disclosure. As shown in FIG. 7, in the example 700, the user inputs a text description "Two puppies are running towards the camera" for describing content of a video in a text input control 704 of a user interface 702, and selects a reference image (shown in a starting frame control 708). In the starting frame control 708, the user uses a black bounding box 730 to identify the white puppy as an object 1, and uses a white bounding box 732 to identify the black puppy as an object 2, and in an ending frame control 718, uses a black hard bounding box 740 to specify a position to which the white puppy moves, and a size of the white puppy, and uses a white hard bounding box 742 to specify a position to which the black puppy moves, and a size of the black puppy. However, the bounding boxes in the ending frame cannot directly intervene in the motion process of the white puppy from the position of the bounding box 730 to the position of the bounding box 740. Therefore, in the example 700, the user inserts the intermediate frame between the starting frame and the ending frame. Accordingly, the user interface 702 displays an intermediate frame control 728 and a set of controls associated with the intermediate frame control 728 (e.g., color display controls for the objects, and bounding box type selection controls). These controls have the same functions as the set of controls associated with the ending frame control 718.

As shown in FIG. 7, in the example 700, the user uses a black soft bounding box 750 in the intermediate frame control 728 to constrain a position to which the white puppy moves, and a size of the white puppy, and uses a white soft bounding box 752 to constrain a position to which the black puppy moves, and a size of the black puppy. Accordingly, in the generated video, as the white puppy runs from a position in the bounding box 730 to a position specified by the hard bounding box 740, the white puppy first passes through a certain position in an area specified by the soft bounding box 750, and then moves to the position specified by the hard bounding box 740. As the black puppy runs from a position in the bounding box 732 to a position specified by the hard bounding box 742, the black puppy first passes through a certain position in an area specified by the soft bounding box 752. Additionally, in the user interface 702, the user may also insert more intermediate frames by intersecting with image frame insertion controls 760 and 762, thereby more precisely controlling the motion process of the two puppies.

Accordingly, the motion process of the controlled objects is precisely controlled by inserting the intermediate frame between the starting frame and the ending frame. Compared with the motion trajectory, through the method of inserting the intermediate frame, the sizes of the objects in the motion process may also be controlled, thereby making a motion control function of the application better improved.

To achieve bounding box-guided video generation, a motion control module may be inserted in the existing video generation model. The motion control module may process the bounding boxes into control tokens, and fuse, using a self-attention layer, the control tokens with visual tokens used to generate image frames, thereby generating fused visual tokens. These fused visual tokens include motion control information provided by the bounding boxes.

In an example architecture, a spatial self-attention layer, a multilayer perceptron, a motion control module, and a spatial cross-attention layer are included. The spatial self-attention layer and the spatial cross-attention layer may be, for example, modules within a video diffusion model based on a three-dimensional U network (3D U-Net) architecture. The video diffusion model may iteratively predict a noise vector in a noisy video input, thereby gradually converting pure Gaussian noise into a high-quality video frame. The 3D U-Net is composed of alternating convolutional blocks and attention blocks. Each block includes two components: a spatial component that processes each image frame as a separate image, and a temporal component that facilitates information exchange between image frames. In each attention block, the spatial component typically includes a self-attention layer, followed by a cross-attention layer, where the cross-attention layer is used to adjust video generation based on text prompts. The motion control module is inserted between the two attention layers, thereby allowing the model to manage motion control in the video generation.

In the example architecture, the motion control module is inserted between the spatial self-attention layer and the spatial cross-attention layer of the original video diffusion model. The spatial self-attention layer receives frame-level visual tokens and generates visual tokens based on the frame-level visual tokens. The motion control module receives the visual tokens and the control tokens as inputs, and outputs the fused visual tokens. Each of the control tokens corresponds to the corresponding object (or the bounding box). Since the control tokens include the motion control information provided by the bounding boxes, the fused visual tokens also include the motion control information provided by the bounding boxes. Then, the visual tokens are inputted into the spatial cross-attention layer, and the spatial cross-attention layer may generate updated frame-level visual tokens based on the visual tokens and text tokens. Then, the video diffusion model may generate image frames based on the updated frame-level visual tokens. In order not to change an original structure of the spatial cross-attention layer, the number of the visual tokens may be kept the same as the number of the visual tokens. In this way, by fixing parameters of the original video diffusion model (including the spatial self-attention layer and the spatial cross-attention layer) in a training stage and only adjusting parameters of the motion control module, retraining caused by modifying the structure of the video diffusion model can be avoided, thereby saving costs, and avoiding accuracy degradation of the original video diffusion model caused by retraining.

In the example architecture, the number of the control tokens depends on the number of bounding boxes that simultaneously exist in a single image frame supported by the video generation model, and the control tokens are in one-to-one correspondence with the bounding boxes. For example, if the video generation model only supports an image frame including a bounding box for one object, there is 1 control token; and if the video generation model supports an image frame simultaneously including 5 bounding boxes for 5 objects, there are 5 control tokens. If the video generation model supports simultaneously providing 5 bounding boxes in an image frame, but only the motion of two objects needs to be controlled in a video to be generated (i.e., only providing 2 bounding boxes), the missing 3 control tokens may be filled with learnable specific tokens. In the example architecture, the text tokens are not essential. That is, if the user does not provide the text description of the video to be generated, the learnable tokens may be used to fill in the missing text tokens.

To generate a control token, coordinates of a bounding box, an object identifier used to identify uniqueness of the bounding box, and a bounding box type may be determined. Then, the control token is generated based on the coordinates, the object identifier, and the bounding box type. For example, an object identifier may be represented in a color RGB space, where each object corresponds to a bounding box with a unique color, such that the object identifier is a vector with a 3-dimensional RGB value normalized between 0 and 1. The coordinates, the object identifier, and the bounding box type are concatenated into a vector, and a corresponding embedding is generated via a Fourier embedding operation. Then, the embedding is inputted into the multilayer perceptron to generate the control token. By using the RGB value to generate the object identifier, the corresponding bounding box may be generated in the image frame based on the object identifier in the training stage, thereby facilitating alignment between the generated bounding box and a ground truth bounding box, and improving a model training effect.

It should be understood that although the example architecture illustrates generating the control token based on the coordinates of the bounding box, the object identifier, and the bounding box type, the object identifier and the bounding box are not essential in some embodiments. For example, in some embodiments, if only one specific type of bounding box (e.g., a hard bounding box) is supported, a control token may be generated based solely on coordinates. In some embodiments, if only a plurality of specific types of bounding boxes are supported, control tokens may be generated based solely on coordinates and object identifiers.

In this way, the motion control module may provide precise motion control information for the original video diffusion model, thereby improving an effect of the generated image frame, and allowing the object to move according to a motion mode expected by the user. In addition, because the inserted motion control module does not change the structure and the parameters of the original video diffusion model, the example architecture may reuse the capability of the trained video diffusion model, thereby improving the motion control on the object in the video while ensuring the screen quality of the generated video.

Figure 8:
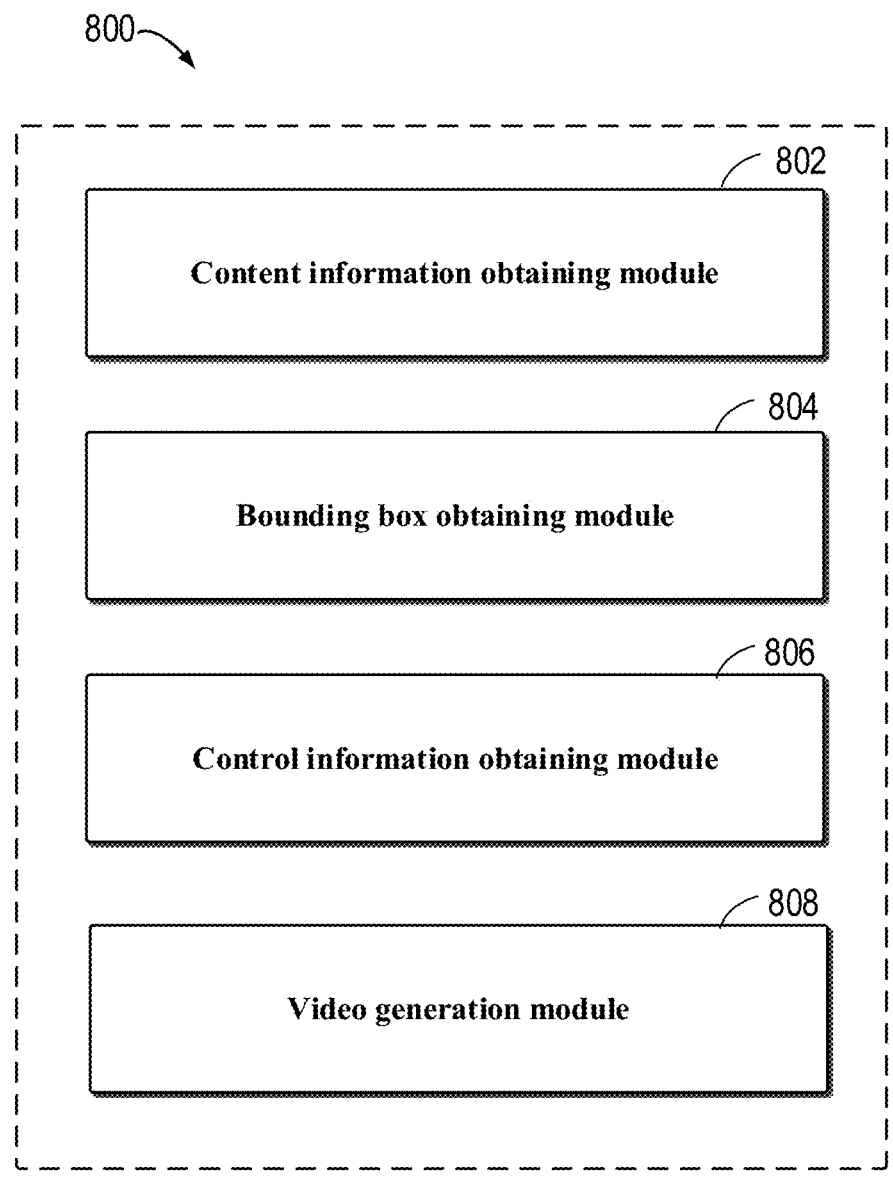
FIG. 8 illustrates a block diagram of an apparatus for generating a video according to some embodiments of the present disclosure.
Figure 9:
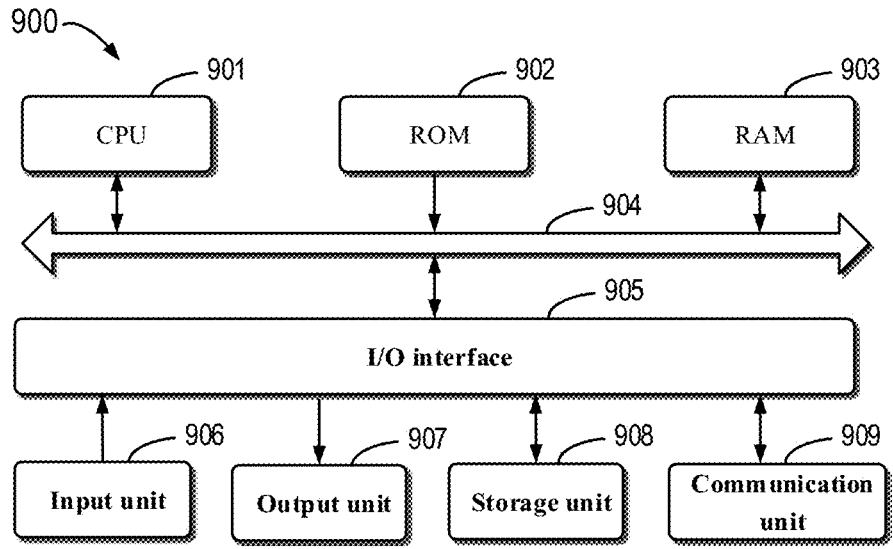
FIG. 9 illustrates a block diagram of a device capable of implementing a plurality of embodiments of the present disclosure.

FIG. 8 illustrates a block diagram of an apparatus 800 for generating a video according to some embodiments of the present disclosure. As shown in FIG. 8, the apparatus 800 includes a content information obtaining module 802, configured to obtain content information related to content of a video to be generated, where the content information includes at least one of a text or an image. The apparatus 800 further includes a position information obtaining module 804, configured to obtain position information indicating a position of an object in the video in a starting frame. The apparatus 800 further includes a control information obtaining module 806, configured to obtain control information constraining a position of the object in an ending frame. In addition, the apparatus 800 further includes a video generation module 808, configured to generate the video based on the content information, the position information, and the control information.

It should be understood that by utilizing the apparatus 800 in the present disclosure, at least one of the many advantages capable of being implemented in the methods or the processes described above may be achieved. For example, the apparatus 800 may allow the user to use the bounding box in the starting frame to accurately identify the object to be controlled. Additionally, the user can accurately express the position of the identified object moving from the starting frame to the ending frame, allowing the application to receive precise motion control requirements and generate the video that meets user expectations.

FIG. 8 illustrates a block diagram of a device 800 capable of implementing a plurality of embodiments of the present disclosure. The device 800 may be a device or apparatus described in the embodiments of the present disclosure. As shown in FIG. 8, the device 800 includes a central processing unit (CPU) and/or a graphics processing unit (GPU) 801, which may perform various suitable actions and processing according to computer program instructions stored in a read-only memory (ROM) 802 or computer program instructions loaded from a storage unit 808 into a random access memory (RAM) 803. The RAM 803 may also store various programs and data required for the operation of the storage device 800. The CPU/GPU 801, the ROM 802, and the RAM 803 are connected to one another through a bus 804. An input/output (I/O) interface 805 is also connected to the bus 804. Although not shown in FIG. 8, the device 800 may also include a coprocessor.

A plurality of components in the device 800 are connected to the I/O interface 805, including an input unit 806 such as a keyboard and a mouse; an output unit 807 such as various types of displays and speakers; the storage unit 808 such as a disk and an optical disc; and a communication unit 809 such as a network card, a modem, and a wireless communication transceiver. The communication unit 809 allows the device 800 to exchange information/data with other devices through a computer network such as the Internet, and/or various telecommunication networks.

The various methods or processes described above may be performed by the CPU/GPU 801. For example, in some embodiments, the method may be implemented as a computer software program that is tangibly included in a machine-readable medium, such as the storage unit 808. In some embodiments, part or all of the computer program may be loaded and/or installed onto the device 800 via the ROM 802 and/or the communication unit 809. When the computer program is loaded onto the RAM 803 and executed by the CPU/GPU 801, one or more of steps or actions of the methods or the processes described above may be performed.

In some embodiments, the methods and the processes described above may be implemented as a computer program product. The computer program product may include a computer-readable storage medium, carrying computer-readable program instructions for performing various aspects of the present disclosure.

The computer-readable storage medium may be a tangible device that may retain and store instructions used by an instruction-executing device. The computer-readable storage medium may be, for example, but is not limited to, an electric storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard drive, a random access memory (RAM), a read-only memory (ROM), an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device, such as a punch card or a raised structure in a groove with instructions stored thereon, and any suitable combination of the above. The computer-readable storage medium used herein is not to be interpreted as transient signals, such as radio waves or other freely propagating electromagnetic waves, electromagnetic waves propagated through waveguides or other transmission media (e.g., light pulses through fiber-optic cables), or electrical signals transmitted through wires.

The computer-readable program instructions described herein may be downloaded from the computer-readable storage medium to various computing/processing devices or downloaded to an external computer or an external storage device through a network, such as the Internet, a local area network, a wide area network, and/or a wireless network. The network may include a copper transmission cable, fiber optic transmission, wireless transmission, a router, a firewall, a switch, a gateway computer, and/or an edge server. A network adapter card or a network interface in each computing/processing device receives the computer-readable program instructions from the network and forwards the computer-readable program instructions for storage in the computer-readable storage medium in each computing/processing device.

The computer program instructions for performing the operation of the present disclosure may be assembly instructions, instruction set architecture (ISA) instructions, machine instructions, machine-dependent instructions, microcode, firmware instructions, state setting data, or source code or object code written in any combination of one or more programming languages, where the programming languages include object-oriented programming languages and conventional procedural programming languages. The computer-readable program instructions may be executed entirely on a user computer, partly on the user computer, as a stand-alone software package, partly on the user computer and partly on a remote computer, or entirely on the remote computer or the server. In the case of involving the remote computer, the remote computer may be connected to the user computer through any type of network, including a local area network (LAN) or wide area network (WAN), or may be connected to the external computer (e.g., utilizing an Internet service provider for Internet connectivity). In some embodiments, an electronic circuit, such as a programmable logic circuit, a field programmable gate array (FPGA), or a programmable logic array (PLA), is customized by utilizing state information of the computer-readable program instructions. The electronic circuit may execute the computer-readable program instructions so as to implement various aspects of the present disclosure.

These computer-readable program instructions may be provided to a processing unit of a general-purpose computer, a special-purpose computer, or another programmable data processing apparatus, thereby producing a machine, such that these instructions, when executed by the processing unit of the computer or the another programmable data processing apparatus, produce an apparatus for implementing functions/actions specified in one or more blocks in the flowcharts and/or the block diagrams. These computer-readable program instructions may also be stored in the computer-readable storage medium, and these instructions allow the computer, the programmable data processing apparatus, and/or another device to operate in a specific method; and therefore, the computer-readable medium having instructions stored therein includes a product that includes instructions for implementing various aspects of the functions/actions specified in one or more blocks in the flowcharts and/or the block diagrams.

The computer-readable program instructions may also be loaded to the computer, the another programmable data processing apparatus, or the another device, such that a series of operating steps are performed on the computer, the another programmable data processing apparatus, or the another device to produce a computer-implemented process, and accordingly, the instructions executed on the computer, the another programmable data processing apparatus, or the another device implement the functions/actions specified in one or more blocks in the flowcharts and/or the block diagrams.

The flowcharts and the block diagrams in the accompanying drawings illustrate the possibly implemented system architectures, functions, and operations of the device, the method, and the computer program product according to the various embodiments of the present disclosure. In this regard, each block in the flowcharts or the block diagrams may represent a module, a program segment, or a portion of code, and the module, the program segment, or the portion of code includes one or more executable instructions for implementing specified logical functions. In some alternative implementations, functions marked in the blocks may also occur in an order different from that marked in the accompanying drawings. For example, two successive blocks may actually be executed in parallel substantially, and sometimes may also be executed in a reverse order, depending on functions involved. It should be further noted that each block in the block diagrams and/or the flowcharts, as well as a combination of the blocks in the block diagrams and/or the flowcharts may be implemented by using a dedicated hardware-based system that executes specified functions or actions, or using a combination of dedicated hardware and computer instructions.

Some example implementations of the present disclosure are listed below.

Example 1. A method for generating a video, including:
obtaining content information related to content of the video to be generated, where the content information comprises at least one of a text or an image;
obtaining position information indicating a position of an object in the video in a starting frame;
obtaining control information constraining a position of the object in an ending frame; and
generating the video based on the content information, the position information, and the control information.

Example 2. The method according to Example 1, where the object is a first object, the position information is a first bounding box with a first color, the control information is first control information with the first color, and generating the video comprises:
obtaining a second bounding box indicating a position of a second object in the video in the starting frame, wherein the second bounding box has a second color different from the first color;
obtaining second control information constraining a position of the second object in the ending frame, wherein the second control information has the second color; and
generating the video based on the content information, the first bounding box, the first control information, the second bounding box, and the second control information.

Example 3. The method according to Examples 1 to 2, where the position information is a starting bounding box, the control information is an ending bounding box for the object in the ending frame, and both the starting bounding box and the ending bounding box are rectangular boxes.

Example 4. The method according to Examples 1 to 3, where generating the video based on the content information, the position information, and the control information comprises:
generating, in response to a user selecting a first type as a type of the ending bounding box, the video by making the object move from a position indicated by the starting bounding box to a specific position indicated by the ending bounding box, wherein a size of the object in the ending frame corresponds to the ending bounding box.

Example 5. The method according to Examples 1 to 4, where generating the video based on the content information, the position information, and the control information comprises:
generating, in response to a user selecting a second type as a type of the ending bounding box, the video by making the object move from a position indicated by the starting bounding box to a position range indicated by the ending bounding box, wherein a size of the object in the ending frame does not exceed the ending bounding box, and content of the video is associated with the content information.

Example 6. The method according to Examples 1 to 5, where generating the video based on the content information, the position information, and the control information comprises:
generating, in response to the ending bounding box being close to a left boundary or a right boundary of the ending frame and a width of the ending bounding box being less than a threshold width, the video by making the object move from a position in the starting frame to a position beyond the left boundary or the right boundary of the ending frame, wherein a size of the object as the object moves beyond the left boundary or the right boundary is associated with a height of the ending bounding box; or,
generating, in response to the ending bounding box being close to an upper boundary or a lower boundary of the ending frame and the height of the ending bounding box being less than a threshold height, the video by making the object move from a position in the starting frame to a position beyond the upper boundary or the lower boundary of the ending frame, wherein a size of the object as the object moves beyond the upper boundary or the lower boundary is associated with the width of the ending bounding box, and where content of the video is associated with the content information.

Example 7. The method according to Examples 1 to 6, where generating the video based on the content information, the position information, and the control information comprises:

generating, in response to the starting bounding box being close to a left boundary or a right boundary of a starting frame and a width of the starting bounding box being less than a threshold width, the video by making the object move from a position beyond the left boundary or the right boundary to a position constrained by the control information, wherein a size of the object as the object enters the left boundary or the right boundary is associated with a height of the starting bounding box; or generating, in response to the starting bounding box being close to an upper boundary or a lower boundary of the starting frame and the height of the starting bounding box being less than a threshold height, the video by making the object move from a position beyond the upper boundary or the lower boundary of the starting frame to a position constrained by the control information, wherein a size of the object as the object enters the upper boundary or the lower boundary is associated with the width of the ending bounding box, and where content of the video is associated with the content information.

Example 8. The method according to Examples 1 to 7, where the position information is a bounding box, and the control information is a motion trajectory drawn in the starting frame.

Example 9. The method according to Examples 1 to 8, where generating the video based on the content information, the position information, and the control information comprises:

generating the video by making the object start to move from a position indicated by the bounding box along the motion trajectory, wherein content of the video is associated with the content information.

Example 10. The method according to Examples 1 to 9, where the position information is a bounding box, the content information comprises an image selected by the user for the starting frame, and generating the video based on the content information, the position information, and the control information comprises:

determining image content identified by the bounding box in the starting frame as the object; and generating the video based on the image of the starting frame, the object, and the control information, wherein content of the video is associated with the image.

Example 11. The method according to Examples 1 to 10, where the content information comprises a text inputted by the user for describing the content of the video, and the method further comprises:

recognizing a noun phrase in the text;

determining the noun phrase as the object; and generating the video based on the text, the object, and the control information, wherein the content of the video is associated with the text.

Example 12. The method according to Examples 1 to 11, where the control information is first control information, and the method further comprises:

obtaining third control information constraining a position of the object in an intermediate frame; and generating the video based on the content information, the position information, the first control information, and the third control information.

Example 13. The method according to Example 1, where the object gradually moves from a first position to a second position in the video.

Example 14. The method according to Example 1, where in the video, by changing a perspective of a camera, the object moves relative to the camera.

Example 15. An apparatus for generating a video, including:

a content information obtaining module, configured to obtain content information related to content of the video to be generated, where the content information includes at least one of a text or an image;

a position information obtaining module, configured to obtain position information indicating a position of an object in the video in a starting frame;

a control information obtaining module, configured to obtain control information that constrains a position of the object in an ending frame; and a video generation module, configured to generate the video based on the content information, the position information, and the control information.

Example 16. The apparatus according to Example 15, where the object is a first object, the position information refers to a first bounding box with a first color, the control information is first control information with the first color, and the generating the video includes:

a second bounding box obtaining module, configured to obtain a second bounding box indicating a position of a second object in the video in the starting frame, where the second bounding box has a second color different from the first color;

a second control information obtaining module, configured to obtain second control information that constrains a position of the second object in the ending frame, where the second control information has the second color; and a second bounding box use module, configured to generate the video based on the content information, the first bounding box, the first control information, the second bounding box, and the second control information.

Example 17. The apparatus according to Examples 15 to 16, where the position information is a starting bounding box, the control information is an ending bounding box for the object in the ending frame, and both the starting bounding box and the ending bounding box are rectangular boxes.

Example 18. The apparatus according to Examples 15 to 17, where generating the video based on the content information, the position information, and the control information includes:

a first-type video generation module, configured to generate, in response to the user selecting a first type as the type of the ending bounding box, the video by making the object move from a position indicated by the starting bounding box to a specific position indicated by the ending bounding box, where the size of the object in the ending frame corresponds to the ending bounding box.

Example 19. The apparatus according to Examples 15 to 18, where generating the video based on the content information, the position information, and the control information includes:

a second-type video generation module, configured to generate, in response to the user selecting a second type as the type of the ending bounding box, the video by making the object move from a position indicated by the starting bounding box to a position range indicated by the ending bounding box, where the size of the object in the ending frame does not exceed the ending bounding box, and the content of the video is associated with the content information.

Example 20. The apparatus according to Examples 15 to 19, where generating the video based on the content information, the position information, and the control information includes:

a first boundary judgment module, configured to generate, in response to the ending bounding box being close to a left boundary or a right boundary of the ending frame and a width of the ending bounding box being less than a threshold width, the video by making the object move from a position in the starting frame to a position beyond the left boundary or the right boundary of the ending frame, where the size of the object as the object moves beyond the left boundary or the right boundary is associated with a height of the ending bounding box; or, a second boundary judgment module, configured to generate, in response to the ending bounding box being close to an upper boundary or a lower boundary of the ending frame and the height of the ending bounding box being less than a threshold height, the video by making the object move from a position in the starting frame to a position beyond the upper boundary or the lower boundary of the ending frame, where the size of the object as the object moves beyond the upper boundary or the lower boundary is associated with the width of the ending bounding box, and where the content of the video is associated with the content information.

Example 21. The apparatus according to Examples 15 to 20, where generating the video based on the content information, the position information, and the control information includes:

a third boundary judgment module, configured to generate, in response to the starting bounding box being close to a left boundary or a right boundary of a starting frame and a width of the starting bounding box being less than a threshold width, the video by making the object move from a position beyond the left boundary or the right boundary to a position constrained by the control information, where the size of the object as the object enters the left boundary or the right boundary is associated with a height of the starting bounding box; or a fourth boundary judgment module, configured to generate, in response to the starting bounding box being close to an upper boundary or a lower boundary of the starting frame and the height of the starting bounding box being less than a threshold height, the video by making the object move from a position beyond the upper boundary or the lower boundary of the starting frame to a position constrained by the control information, where the size of the object as the object enters the upper boundary or the lower boundary is associated with the width of the ending bounding box, and where the content of the video is associated with the content information.

Example 22. The apparatus according to Examples 15 to 21, where the position information is a bounding box, and the control information is a motion trajectory drawn in the starting frame.

Example 23. The apparatus according to Examples 15 to 22, where generating the video based on the content information, the position information, and the control information includes:

a motion trajectory use module, configured to generate the video by making the object start to move from a position indicated by the bounding box along the motion trajectory, where the content of the video is associated with the content information.

Example 24. The apparatus according to Examples 15 to 23, where the content information includes an image selected by the user for the starting frame, and generating the video based on the content information, the position information, and the control information includes:

an object determination module, configured to determine image content identified by the bounding box in the starting frame as the object; and generate the video based on the image of the starting frame, the object, and the control information, where the content of the video is associated with the image.

Example 25. The apparatus according to Examples 15 to 24, where the content information includes a text inputted by the user for describing the content of the video, and the example further includes:

a noun recognition module, configured to recognize a noun phrase in the text;

a noun use module, configured to determine the noun phrase as the object; and an object use module, configured to generate the video based on the text, the object, and the control information, where the content of the video is associated with the text.

Example 26. The apparatus according to Examples 15 to 25, where the control information is first control information, and the example further includes:

a third control information obtaining module, configured to obtain third control information that constrains a position of the object in an intermediate frame; and a third control information use module, configured to generate the video based on the content information, the position information, the first control information, and the third control information.

Example 27. The apparatus according to Examples 15 to 26, where the object gradually moves from a first position to a second position in the video.

Example 28. The apparatus according to Examples 15 to 27, where in the video, by changing the perspective of a camera, the object moves relative to the camera.

Example 29. An electronic device, including:

a processor; and a memory coupled with the processor, where the memory has instructions stored therein, and the instructions, when executed by the processor, cause the electronic device to implement a method for generating a video, and the method includes:

obtaining content information related to content of the video to be generated, where the content information includes at least one of a text or an image;

obtaining position information indicating a position of an object in the video in a starting frame;

obtaining control information that constrains a position of the object in an ending frame; and generating the video based on the content information, the position information, and the control information.

Example 30. The device according to Example 29, where the object is a first object, the position information is a first bounding box with a first color, the control information is first control information with the first color, and the generating the video includes:

obtaining a second bounding box indicating a position of a second object in the video in the starting frame, where the second bounding box has a second color different from the first color;

obtaining second control information that constrains a position of the second object in the ending frame, where the second control information has the second color; and generating the video based on the content information, the first bounding box, the first control information, the second bounding box, and the second control information.

Example 31. The device according to Examples 29 to 30, where the position information is a starting bounding box, the control information is an ending bounding box for the object in the ending frame, and both the starting bounding box and the ending bounding box are rectangular boxes.

Example 32. The device according to Examples 29 to 31, where generating the video based on the content information, the position information, and the control information includes:

generating, in response to the user selecting a first type as the type of the ending bounding box, the video by making the object move from a position indicated by the starting bounding box to a specific position indicated by the ending bounding box, where the size of the object in the ending frame corresponds to the ending bounding box.

Example 33. The device according to Examples 29 to 32, where generating the video based on the content information, the position information, and the control information includes:

generating, in response to the user selecting a second type as the type of the ending bounding box, the video by making the object move from a position indicated by the starting bounding box to a position range indicated by the ending bounding box, where the size of the object in the ending frame does not exceed the ending bounding box, and the content of the video is associated with the content information.

Example 34. The device according to Examples 29 to 33, where generating the video based on the content information, the position information, and the control information includes:

generating, in response to the ending bounding box being close to a left boundary or a right boundary of the ending frame and a width of the ending bounding box being less than a threshold width, the video by making the object move from a position in the starting frame to a position beyond the left boundary or the right boundary of the ending frame, where the size of the object as the object moves beyond the left boundary or the right boundary is associated with a height of the ending bounding box; or, generating, in response to the ending bounding box being close to an upper boundary or a lower boundary of the ending frame and the height of the ending bounding box being less than a threshold height, the video by making the object move from a position in the starting frame to a position beyond the upper boundary or the lower boundary of the ending frame, where the size of the object as the object moves beyond the upper boundary or the lower boundary is associated with the width of the ending bounding box, and where the content of the video is associated with the content information.

Example 35. The device according to Examples 29 to 34, where generating the video based on the content information, the position information, and the control information includes:

generating, in response to the starting bounding box being close to a left boundary or a right boundary of a starting frame and a width of the starting bounding box being less than a threshold width, the video by making the object move from a position beyond the left boundary or the right boundary to a position constrained by the control information, where the size of the object as the object enters the left boundary or the right boundary is associated with a height of the starting bounding box; or generating, in response to the starting bounding box being close to an upper boundary or a lower boundary of the starting frame and the height of the starting bounding box being less than a threshold height, the video by making the object move from a position beyond the upper boundary or the lower boundary of the starting frame to a position constrained by the control information, where the size of the object as the object enters the upper boundary or the lower boundary is associated with the width of the ending bounding box, and where the content of the video is associated with the content information.

Example 36. The device according to Examples 29 to 35, where the position information is a bounding box, and the control information is a motion trajectory drawn in the starting frame.

Example 37. The device according to Examples 29 to 36, where generating the video based on the content information, the position information, and the control information includes:

generating the video by making the object start to move from a position indicated by the bounding box along the motion trajectory, where the content of the video is associated with the content information.

Example 38. The device according to Examples 29 to 37, where the content information includes an image selected by the user for the starting frame, and generating the video based on the content information, the position information, and the control information includes:

determining image content identified by the bounding box in the starting frame as the object; and generating the video based on the image of the starting frame, the object, and the control information, where the content of the video is associated with the image.

Example 39. The device according to Examples 29 to 38, where the content information includes a text inputted by the user for describing the content of the video, and the example further includes:

recognizing a noun phrase in the text;

determining the noun phrase as the object; and generating the video based on the text, the object, and the control information, where the content of the video is associated with the text.

Example 40. The device according to Examples 29 to 39, where the control information is first control information, and the example further includes:

obtaining third control information that constrains a position of the object in an intermediate frame; and generating the video based on the content information, the position information, the first control information, and the third control information.

Example 41. The device according to Examples 29 to 40, where the object gradually moves from a first position to a second position in the video.

Example 42. The method according to Examples 29 to 41, where in the video, by changing the perspective of a camera, the object moves relative to the camera.

The embodiments of the present disclosure have been described above. The above description is illustrative, rather than exhaustive, and is not limited to the disclosed various embodiments. Numerous modifications and alterations are apparent to those of ordinary skill in the art without departing from the scope and spirit of the illustrated embodiments. The selection of the terms as used herein is intended to best explain the principles and practical applications of the various embodiments, or improvements to technologies on the market, or to allow other persons of ordinary skill in the art to understand the various embodiments disclosed herein.

The invention claimed is:

1. A method for generating a video, comprising:

obtaining content information related to content of the video to be generated, wherein the content information comprises a starting frame of the video;

obtaining, via a user interface, position information input by a user for identifying an object whose motion is to be controlled in the starting frame, wherein the position information is obtained through a first user interaction on the starting frame;

obtaining, via the user interface, control information constraining a position of the object in an ending frame, wherein the control information comprises at least one of a drawn bounding box or a drawn motion trajectory, and the control information is obtained through a second user interaction on the starting frame or a component representing the ending frame; and generating the video based on the content information, the position information, and the control information, wherein generating the video based on the content information, the position information, and the control information comprises:

in response to the control information being a trajectory line drawn in the starting frame, generating the video by controlling the object to move from a starting position along the trajectory line to a position indicated by an end point of the trajectory line.

2. The method according to claim 1, wherein the object is a first object, the position information is a first bounding box with a first color, the control information is first control information with the first color, and generating the video comprises:

obtaining a second bounding box indicating a position of a second object in the video in the starting frame, wherein the second bounding box has a second color different from the first color;

obtaining second control information constraining a position of the second object in the ending frame, wherein the second control information has the second color; and generating the video based on the content information, the first bounding box, the first control information, the second bounding box, and the second control information.

3. The method according to claim 1, wherein the position information is a starting bounding box, the control information is an ending bounding box for the object in the ending frame, and both the starting bounding box and the ending bounding box are rectangular boxes.

4. The method according to claim 3, wherein generating the video based on the content information, the position information, and the control information comprises:

generating, in response to the user selecting a first type as a type of the ending bounding box, the video by making the object move from a position indicated by the starting bounding box to a specific position indicated by the ending bounding box, wherein a size of the object in the ending frame corresponds to the ending bounding box.

5. The method according to claim 3, wherein generating the video based on the content information, the position information, and the control information comprises:

generating, in response to the user selecting a second type as a type of the ending bounding box, the video by making the object move from a position indicated by the starting bounding box to a position range indicated by the ending bounding box, wherein a size of the object in the ending frame does not exceed the ending bounding box, and content of the video is associated with the content information.

6. The method according to claim 3, wherein generating the video based on the content information, the position information, and the control information comprises:

generating, in response to the ending bounding box being close to a left boundary or a right boundary of the ending frame and a width of the ending bounding box being less than a threshold width, the video by making the object move from a position in the starting frame to a position beyond the left boundary or the right boundary of the ending frame, wherein a size of the object as the object moves beyond the left boundary or the right boundary is associated with a height of the ending bounding box; or, generating, in response to the ending bounding box being close to an upper boundary or a lower boundary of the ending frame and the height of the ending bounding box being less than a threshold height, the video by making the object move from a position in the starting frame to a position beyond the upper boundary or the lower boundary of the ending frame, wherein a size of the object as the object moves beyond the upper boundary or the lower boundary is associated with the width of the ending bounding box, and wherein content of the video is associated with the content information.

7. The method according to claim 3, wherein generating the video based on the content information, the position information, and the control information comprises:

generating, in response to the starting bounding box being close to a left boundary or a right boundary of a starting frame and a width of the starting bounding box being less than a threshold width, the video by making the object move from a position beyond the left boundary or the right boundary to a position constrained by the control information, wherein a size of the object as the object enters the left boundary or the right boundary is associated with a height of the starting bounding box; or generating, in response to the starting bounding box being close to an upper boundary or a lower boundary of the starting frame and the height of the starting bounding box being less than a threshold height, the video by making the object move from a position beyond the upper boundary or the lower boundary of the starting frame to a position constrained by the control information, wherein a size of the object as the object enters the upper boundary or the lower boundary is associated with the width of the ending bounding box, and wherein content of the video is associated with the content information.

8. The method according to claim 1, wherein the position information is a bounding box.

9. The method according to claim 8, wherein generating the video based on the content information, the position information, and the control information comprises:

generating the video by making the object start to move from a position indicated by the bounding box along the motion trajectory, wherein content of the video is associated with the content information.

10. The method according to claim 1, wherein the position information is a bounding box, and generating the video based on the content information, the position information, and the control information comprises:

determining image content identified by the bounding box in the starting frame as the object; and generating the video based on an image of the starting frame, the object, and the control information, wherein content of the video is associated with the image.

11. The method according to claim 10, wherein the content information comprises a text inputted by the user for describing the content of the video, and the method further comprises:

recognizing a noun phrase in the text;

determining the noun phrase as the object; and generating the video based on the text, the object, and the control information, wherein the content of the video is associated with the text.

12. The method according to claim 1, wherein the control information is first control information, and the method further comprises:

obtaining third control information constraining a position of the object in an intermediate frame; and generating the video based on the content information, the position information, the first control information, and the third control information.

13. The method according to claim 1, wherein the object gradually moves from a first position to a second position in the video.

14. The method according to claim 1, wherein in the video, by changing a perspective of a camera, the object moves relative to the camera.

15. An electronic device, comprising:

a processor; and a memory coupled with the processor, wherein the memory has instructions stored therein, and the instructions, when executed by the processor, cause the electronic device to:

obtain content information related to content of a video to be generated, wherein the content information comprises a starting frame of the video;

obtain, via a user interface, position information input by a user for identifying an object whose motion is to be controlled in the starting frame, wherein the position information is obtained through a first user interaction on the starting frame;

obtain, via the user interface, control information constraining a position of the object in an ending frame, wherein the control information comprises at least one of a drawn bounding box or a drawn motion trajectory, and the control information is obtained through a second user interaction on the starting frame or a component representing the ending frame; and generate the video based on the content information, the position information, and the control information, wherein the instructions causing the electronic device to generate the video based on the content information, the position information, and the control information comprise instructions causing the electronic device to:

in response to the control information being a trajectory line drawn in the starting frame, generate the video by controlling the object to move from a starting position along the trajectory line to a position indicated by an end point of the trajectory line.

16. The electronic device according to claim 15, wherein the object is a first object, the position information is a first bounding box with a first color, the control information is first control information with the first color, and the instructions causing the electronic device to generate the video based on the content information, the position information, and the control information comprise instructions causing the electronic device to:

obtain a second bounding box indicating a position of a second object in the video in the starting frame, wherein the second bounding box has a second color different from the first color;

obtain second control information constraining a position of the second object in the ending frame, wherein the second control information has the second color; and generate the video based on the content information, the first bounding box, the first control information, the second bounding box, and the second control information.

17. The electronic device according to claim 15, wherein the position information is a starting bounding box, the control information is an ending bounding box for the object in the ending frame, and both the starting bounding box and the ending bounding box are rectangular boxes.

18. The electronic device according to claim 17, wherein the instructions causing the electronic device to generate the video based on the content information, the position information, and the control information comprise instructions causing the electronic device to:

generate, in response to the user selecting a first type as a type of the ending bounding box, the video by making the object move from a position indicated by the starting bounding box to a specific position indicated by the ending bounding box, wherein a size of the object in the ending frame corresponds to the ending bounding box.

19. The electronic device according to claim 17, wherein the instructions causing the electronic device to generate the video based on the content information, the position information, and the control information comprise instructions causing the electronic device to:

generate, in response to the user selecting a second type as a type of the ending bounding box, the video by making the object move from a position indicated by the starting bounding box to a position range indicated by the ending bounding box, wherein a size of the object in the ending frame does not exceed the ending bounding box, and content of the video is associated with the content information.

20. A computer program product, wherein the computer program product is tangibly stored on a non-transitory computer-readable medium and comprises machine-executable instructions, and the machine-executable instructions, when executed, cause a machine to:

obtain content information related to content of a video to be generated, wherein the content information comprises a starting frame of the video;

obtain, via a user interface, position information input by a user for identifying an object whose motion is to be controlled in the starting frame, wherein the position information is obtained through a first user interaction on the starting frame;

obtain, via the user interface, control information constraining a position of the object in an ending frame, wherein the control information comprises at least one of a drawn bounding box or a drawn motion trajectory, and the control information is obtained through a second user interaction on the starting frame or a component representing the ending frame; and generate the video based on the content information, the position information, and the control information, wherein the instructions causing the machine to generate the video based on the content information, the position information, and the control information comprise instructions causing the machine to:

in response to the control information being a trajectory line drawn in the starting frame, generate the video by controlling the object to move from a starting position along the trajectory line to a position indicated by an end point of the trajectory line.

* * * * *